US007529709B2

(12) United States Patent
Volchek et al.

(10) Patent No.: US 7,529,709 B2
(45) Date of Patent: May 5, 2009

(54) SYSTEMS AND METHODS TO FACILITATE A TRANSFER OF A REFUND AMOUNT FROM AN EDUCATIONAL INSTITUTION TO A STUDENT

(75) Inventors: Mark T. Volchek, New Haven, CT (US); Miles H. Lasater, New Haven, CT (US); Stephen P. Fitzgerald, Hamden, CT (US); Sean P. Glass, New Haven, CT (US); Dean W. Hatton, Farmington, CT (US); Earnest C. Jones, East Haven, CT (US); Casey M. McGuane, Guilford, CT (US)

(73) Assignee: Higher One, Inc., New Haven, CT (US)

( * ) Notice: Subject to any disclaimer, the term of this patent is extended or adjusted under 35 U.S.C. 154(b) by 18 days.

(21) Appl. No.: 11/832,512

(22) Filed: Aug. 1, 2007

(65) Prior Publication Data

US 2007/0294165 A1 Dec. 20, 2007

Related U.S. Application Data

(63) Continuation-in-part of application No. 10/799,387, filed on Mar. 12, 2004, and a continuation-in-part of application No. 10/345,605, filed on Jan. 16, 2003, now Pat. No. 7,249,096.

(60) Provisional application No. 60/458,671, filed on Mar. 28, 2003, provisional application No. 60/350,255, filed on Jan. 17, 2002.

(51) Int. Cl.
*G06Q 40/00* (2006.01)

(52) U.S. Cl. .............................. 705/38; 705/35; 705/39; 705/45

(58) Field of Classification Search .................. 705/38, 705/35-45; 707/202, 3
See application file for complete search history.

(56) References Cited

U.S. PATENT DOCUMENTS 6,092,053 A * 7/2000 Boesch et al. ................. 705/26
2002/0152162 A1 * 10/2002 Eda et al. ...................... 705/39

OTHER PUBLICATIONS

"PNC Bank Named Preferred Provider of Financial Services to Pitt students", PR Newswire, New York, Aug. 24, 2000.*

* cited by examiner

*Primary Examiner*—Kirsten S Apple
(74) *Attorney, Agent, or Firm*—Wiggin and Dana LLP; Anthony P. Gangemi

(57) ABSTRACT

A system and method of facilitating a transfer of a refund amount from an educational institution to a student. A refund controller receives from an educational institution a request for authorization of an instant paper check of a payment amount equal to at least a portion of a total refund amount associated with the student of the educational institution student. The refund controller verifies the payment amount is equal to or less than an amount of funds available to the student and transfers funds equal to the payment amount to an instant issuance account. The refund controller authorizes the educational institution to issue an instant paper check for the payment amount to the student. The instant paper check draws from the instant issuance account.

15 Claims, 29 Drawing Sheets

500
REFUND CONTROLLER 540
UNIVERSITY 510
TOTAL REFUND AMOUNT
ESCROW ACCOUNT
HOLDING ACCOUNT
EFT
STUDENT BANK 530
PAPER CHECK SENT VIA POSTAL MAIL
STUDENT ID ACCOUNT
520
FACILITATING BANK

800

| STUDENT IDENTIFIER 802 | STUDENT NAME 804 | EDUCATIONAL INSTITUTION 806 | ACCOUNT TYPE 808 | REFUND TRANSFER PREFERENCE 810 | TRANSFER INFORMATION 812 |
|---|---|---|---|---|---|
| S1001 | JANE GREENE | UNIVERSITY OF HOUSTON | SOFT | N/A | N/A |
| S1002 | JOHN SMITH | UNIVERSITY OF HOUSTON | ACTIVATED | EFT | BANK: B1001 ACCOUNT: A1772 |
| S1003 | MARY WEST | YALE | ACTIVATED | PAPER CHECK | 123 NEW ST. NEW YORK, NY |
| S1004 | WILLIAM JAMES | YALE | ACTIVATED | STUDENT ID ACCOUNT | ACCOUNT: A1001 |
| S1005 | SAMANTHA SINGER | YALE | ACTIVATED | STUDENT ID ACCOUNT | ACCOUNT: A1001 |

| REFUND IDENTIFIER 902 | STUDENT IDENTIFIER 904 | EDUCATIONAL INSTITUTION (ESCROW ACCOUNT) 906 | REFUND AMOUNT 908 | REFUND STATUS 910 | REFUND HISTORY 912 |
|---|---|---|---|---|---|
| R1001 | S1002 | UNIVERSITY OF HOUSTON | $10,000.00 | EFT PENDING | NONE |
| R1002 | S1003 | YALE | $15,000.00 | PAPER CHECK MAILED | MAILED 5/25/05 (NOT CASHED) |
| R1003 | S1004 | YALE | $5,000.00 | DEPOSITED INTO STUDENT ID ACCOUNT | 6/6/05 |
| R1004 | S1005 | YALE | $15,000.00 | DEPOSITED INTO STUDENT ID ACCOUNT | 6/7/05 |

FIG. 9

SYSTEMS AND METHODS TO FACILITATE A TRANSFER OF A REFUND AMOUNT FROM AN EDUCATIONAL INSTITUTION TO A STUDENT

CROSS-REFERENCE TO RELATED APPLICATIONS

The present application is a continuation-in-part of U.S. patent application Ser. No. 10/799,387, entitled "Systems and Methods to Facilitate a Transfer of a Refund Amount From an Educational Institution to a Student" and filed on Mar. 12, 2004, which (i) claims the benefit of U.S. Provisional Patent Application No. 60/458,671 entitled "Systems and Methods for Facilitating a Student Refund" and filed on Mar. 28, 2003; and (ii) is a continuation-in-part of U.S. patent application Ser. No. 10/345,605 entitled "Systems and Methods for Facilitating a Distribution of Bank Accounts via an Educational Institution" and filed on Jan. 16, 2003, now U.S. Pat. Ser. No. 7,249,096 which claimed the benefit of U.S. Provisional Patent Application No. 60/350,255 entitled "Systems and Methods for Facilitating a Distribution of Bank Accounts via an Educational Institution" and filed on Jan. 17, 2002. The entire contents of these applications are incorporated herein by reference.

BACKGROUND

In some situations, a student will be entitled to receive a refund from a university. For example, a student who needs to pay ten thousand dollars in tuition and who receives fourteen thousand dollars in financial aid could be entitled to a four thousand dollar refund from the university. Moreover, a university policy and/or a governmental regulation might require that the refund be provided to the student within a pre-determined period of time. For example, the United States Department of Education (DOE) might require that certain refunds be transferred from a university within fourteen days. This can be a difficult task, especially when a significant number of refunds need to be provided and/or when different students want to receive refunds in different ways (e.g., by a direct deposit to a bank account or a paper check mailed to a student's address). For example, in order to transfer a refund amount from a university within a pre-determined period of time, the university might attempt to collect transfer instructions (e.g., bank account numbers) from students before the refund amounts are determined. In some cases, however, a student might not provide the proper instructions in a timely manner. As a result, the university might need to print a paper check for such a student and wait for the student to retrieve the check from a Bursar's Office. Such an approach, however, can cause confusion (for both the student and the university) and might prevent the student from receiving the refund in way he or she prefers.

In addition to any timeliness requirements, a university policy and/or a governmental regulation might mandate that student refunds be adequately insured or otherwise protected (e.g., to protect students if a bank or other institution becomes insolvent). For example, state law might require that all student refunds associated with state universities be kept in accounts that are fully insured. Such a requirement can complicate transactions for a university (e.g., a bank holding refund payments for a university might need to deposit an equivalent amount of its own funds in yet another bank). Note that failing to comply with any of these requirement might have serious consequences for a university (e.g., it might be disqualified from participating in a financial aid program).

SUMMARY

One aspect of the disclosed subject matter is a method of facilitating a transfer of a refund amount from an educational institution to a student. The method includes: receiving from an educational institution a request for authorization of an instant paper check of a payment amount equal to at least a portion of a total refund amount associated with the student of the educational institution student; verifying the payment amount is equal to or less than an amount of funds available to the student; transferring funds equal to the payment amount to an instant issuance account; and authorizing the educational institution to issue an instant paper check for the payment amount to the student, wherein the instant paper check draws from the instant issuance account.

Another aspect of the disclosed subject matter is a system for facilitating a transfer of a refund amount from an educational institution to a student. The system includes: a module for receiving from an educational institution a request for authorization of an instant paper check of a payment amount equal to a total refund amount associated with the student of the educational institution student; a module for verifying a status of the total refund amount associated with the student; a module for transferring funds equal to the total refund amount to an instant issuance account; and a module for authorizing the educational institution to issue an instant paper check for the total refund amount to the student, wherein the instant paper check draws from the instant issuance account.

BRIEF DESCRIPTION OF THE DRAWINGS

FIG. 8 is a tabular representation of a portion of a student database according to one embodiment.

FIG. 9 is a tabular representation of a portion of a refund database according to one embodiment.

DETAILED DESCRIPTION

Some embodiments described herein are associated with "refund amounts" that are provided to students. As used herein, the phrase "refund amount" may refer to, for example, an amount of money that an educational institution needs to transfer to a student. For example, a student may be entitled to a refund when the amount of financial aid he or she is entitled to receive is greater than the cost of tuition. As other examples, a student might be entitled to receive a refund amount when he or she drops a class or has accidentally provided an overpayment.

In addition, some embodiments involve the transfer of money into and out of "bank accounts." As used here, the phrase "bank account" may refer to, for example, a demand deposit account (e.g., as opposed to a mere stored-value account) whereby an account balance can be withdrawn by a depositor without prior notice to the bank (e.g. a checking account). In some cases, money can be withdrawn, for example, via check, an ATM device, or by transfers to other accounts via an Electronic Funds Transfer (EFT) transaction. Other examples of bank accounts include checking accounts, Negotiable Order of Withdrawal (NOW) accounts, money market accounts, savings accounts, asset management accounts, and brokerage accounts.

Moreover, the phrase "educational institution" as used herein may refer to, for example, a university, a college, a technical school, a professional education program, a government training program, or an on-line educational program. Similarly, the phrase "educational institution member" may refer to any person associated with an educational institution, such as a student, an employee (e.g., a faculty member), or an alum of the educational institution.

Refund Transactions

Figure 1:
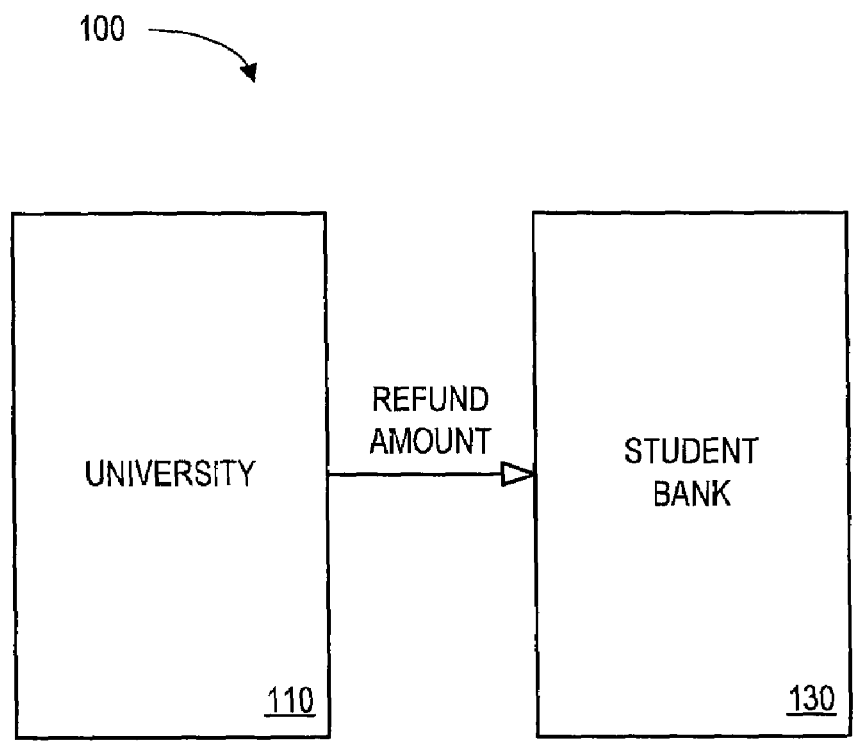
FIG. 1 illustrates a transaction between a university and a student bank.

FIG. 1 illustrates a transaction 100 between a university 110 and a student bank 120. Note that although a university 110 is illustrated in FIG. 1, embodiments may be associated with other types of educational institutions. The university 110 provides a refund amount to the student bank 130. For example, a student who needs to pay fifteen thousand dollars in tuition and who receives a financial aid package worth eighteen thousand dollars (e.g., in grants and/or loans) could be entitled to a three thousand dollar refund from the university 110. When there are a large number of students receiving refunds, however, it might be difficult for the university and/or the university 110 to process the transactions in a timely fashion.

Figure 2:
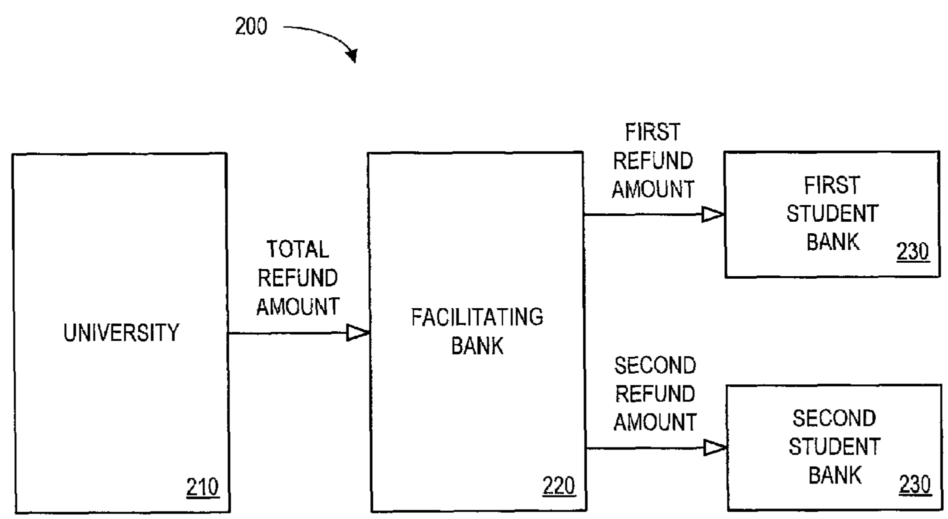
FIG. 2 illustrates a transaction between a university and a student bank via a facilitating bank according to some embodiments.

FIG. 2 illustrates a transaction 200 between a university 210 and student banks 230 via a facilitating bank 220 according to some embodiments. In this case, the university 210 transfers a total refund amount associated with a number of different students to a facilitating bank 220. The facilitating bank 220 may than arrange for each student to receive his or her refund (e.g., by transferring appropriate refund amounts to the student banks 230). Note that in some cases, the transfer of funds from the university 210 to the facilitating bank 220 may take place within a single bank (e.g., the total refund amount might be transferred from one account to another account at that bank).

In addition to the total refund amount, the university 210 may provide additional refund information to the facilitating bank 220. For example, the university 210 may provide a list of students along with an indication of how much money each student should receive from the total refund amount.

Figure 3:
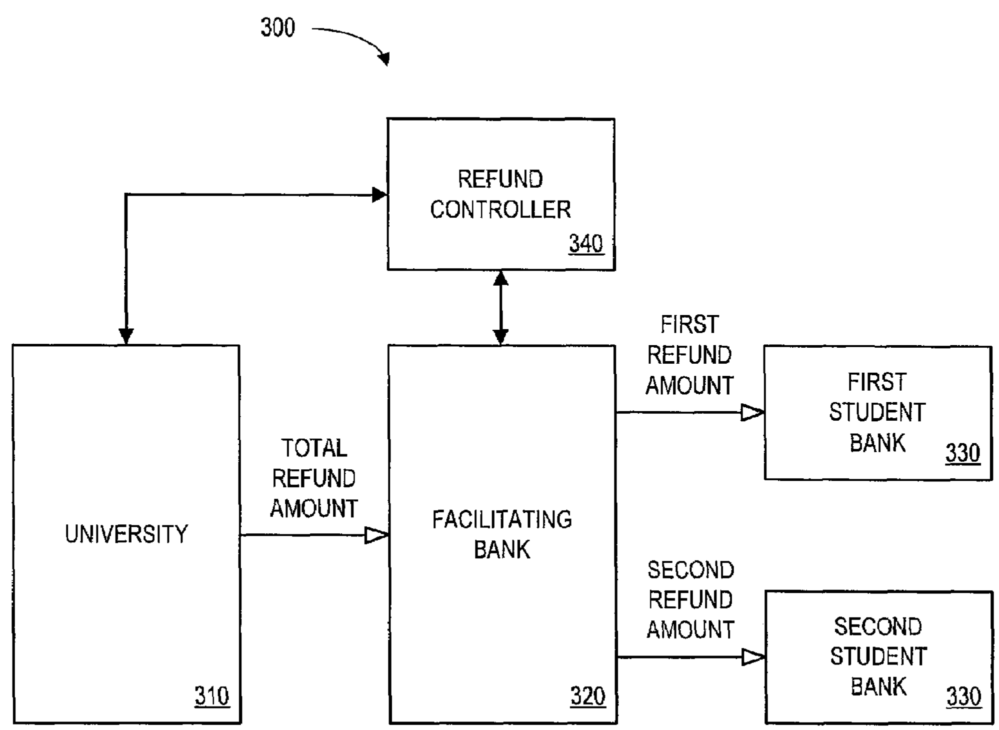
FIG. 3 illustrates a transaction facilitated by a refund controller according to some embodiments.

FIG. 3 illustrates a transaction 300 facilitated by a refund controller 340 according to another approach. As before, a university 310 transfers a total refund amount to a facilitating bank 320 which in turn transfers refund amounts to student banks 330 as appropriate. In this case, however, the facilitating bank 320 receives the additional refund information from the refund controller 340. For example, the university 310 might provide a list of student names to the refund controller 340 along with an indication of the refund amount each student is entitled to receive. The refund controller 340 can then instruct the facilitating bank 320 about how the total refund amount should be distributed. Note that because the facilitating bank 320 is receiving the total refund amount from one source and the instructions from another source, the likelihood of fraud may be reduced (e.g., an individual who works at the university 310 may find it difficult to alter both the total refund amount and the instructions that are provided to the facilitating bank 320).

Note that the facilitating bank 320 may hold some or all of the total refund amount for an extended period of time. Assume, for example, that the university 310 deposited $300,000 with the facilitating bank 320 and the refund controller 340 provided a list of one hundred students who should each receive a check in the amount of $3,000. In this case, the total refund amount would remain at the facilitating bank 320 while the checks are printed, mailed, and deposited by the students (e.g., at various student banks 330). Thus, a university policy or governmental regulation might require that these funds be insured or otherwise protected.

Some bank accounts may be automatically insured up to a pre-determined threshold deposit amount. For example, the Federal Deposit Insurance Corporation (FDIC) might insure an obligation of the bank, such as a bank account, for up to a maximum amount of $100,000. If the total refund amount provided to the facilitating bank 320 exceeds that amount, however, additional steps would need to be taken to protect the funds. For example, the facilitating bank 320 might deposit an equivalent amount of money with a third party (e.g., another bank). In this case, if the facilitating bank 320 should became insolvent for any reason, the university 310 (and, eventually, the students) would not lose the refund money. The additional steps required to protect the funds, however, can complicate transactions for the university 310 and the facilitating bank 320.

Figure 4A:
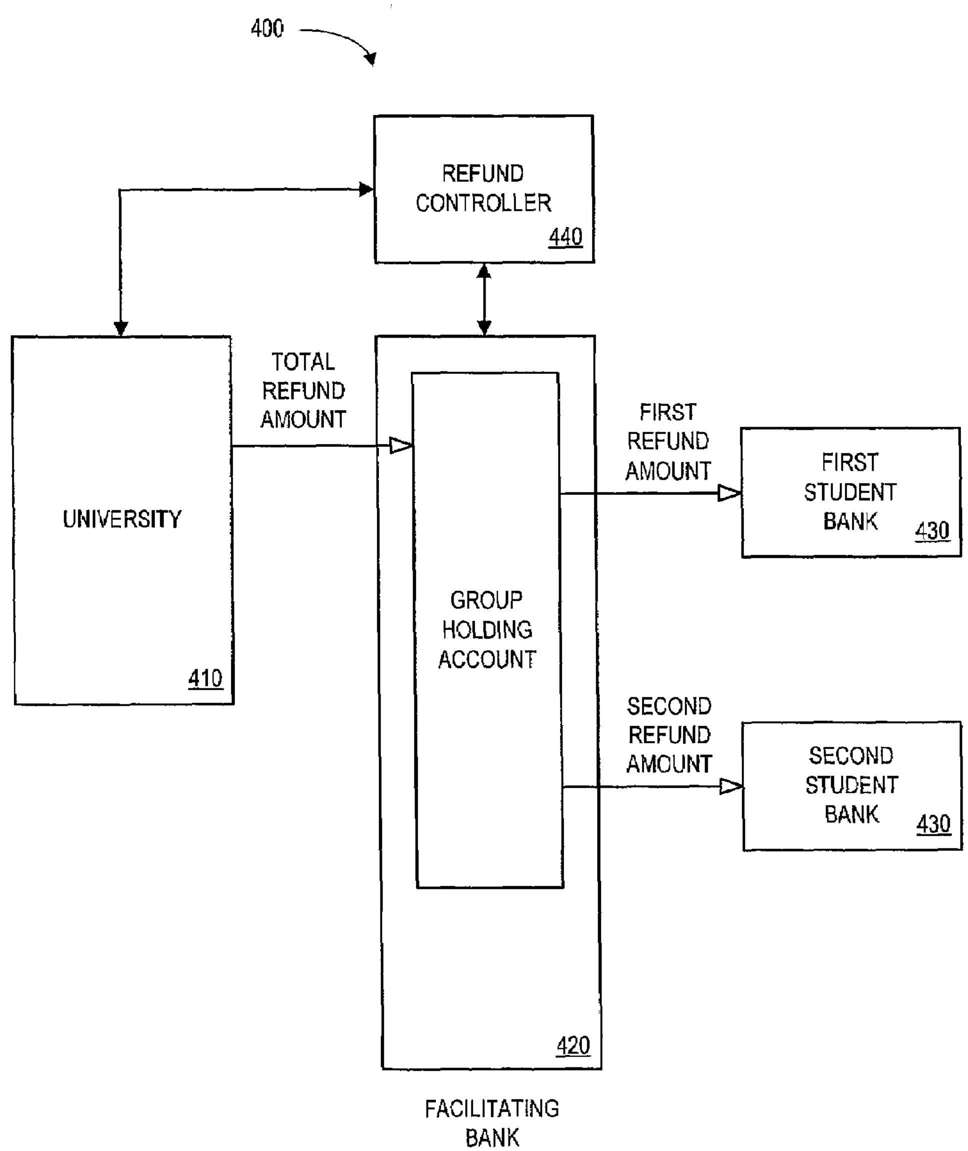
FIGS. 4A through 4D illustrate a transactions facilitated by refund controllers according to some embodiments.

FIGS. 4A through 4D illustrate a transactions facilitated by refund controllers according to some embodiments. In particular, FIG. 4A illustrates a transaction 400 facilitated via a refund controller 440. Again, a university 410 transfers a total refund amount to a facilitating bank 420 which in turn transfers refund amounts to a student bank 430 as appropriate. Moreover, the facilitating bank 420 receives additional refund information from the refund controller 440. For example, the university 410 might provide a list of student names and associated refund amounts to the refund controller 440, which then provides instructions to the facilitating bank 420.

In this case, the university 410 deposits the total refund amount in a group holding account. That is, refund amounts associated with different students may be co-mingled in the group holding account. Because the refund controller 440 has provided instructions to the facilitating bank 420, however, the group holding account might be considered a number of separate obligations of the facilitating bank 420. For example, the FDIC might consider the refund amount associated with each student to be separate obligation of the facilitating bank 420. As a result, each refund amount might be insured up to a pre-determined threshold value (e.g., $100,000).

When the facilitating bank 420 receives instructions from the refund controller 440, refund amounts are transferred from the group holding account to accounts at the appropriate student banks 430.

Figure 4B:
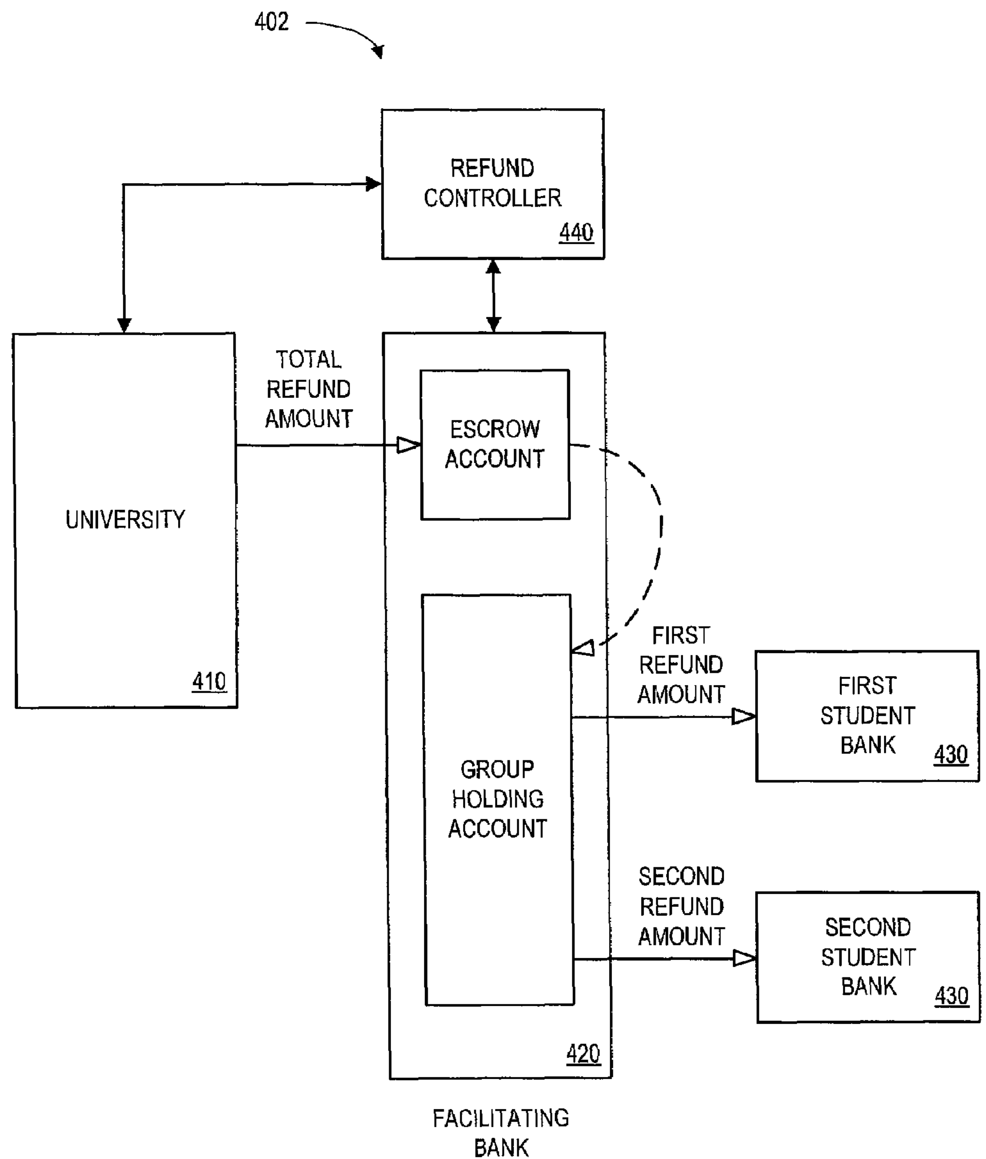

As another example, FIG. 4B illustrates a transaction 402 facilitated via a refund controller 440. In this case, a university 410 transfers a total refund amount to an escrow account at a facilitating bank 420. The total refund amount is then transferred from the escrow account to a group holding account. Moreover, the facilitating bank 420 receives additional refund information from the refund controller 440. For example, the university 410 might provide a list of student names and associated refund amounts to the refund controller 440, which then provides instructions to the facilitating bank 420. By further isolating the total refund amount from the university 410 (e.g., via the escrow account), the likelihood that the funds will be considered to have been transferred from the university 410 in a timely manner may be improved.

Figure 4C:
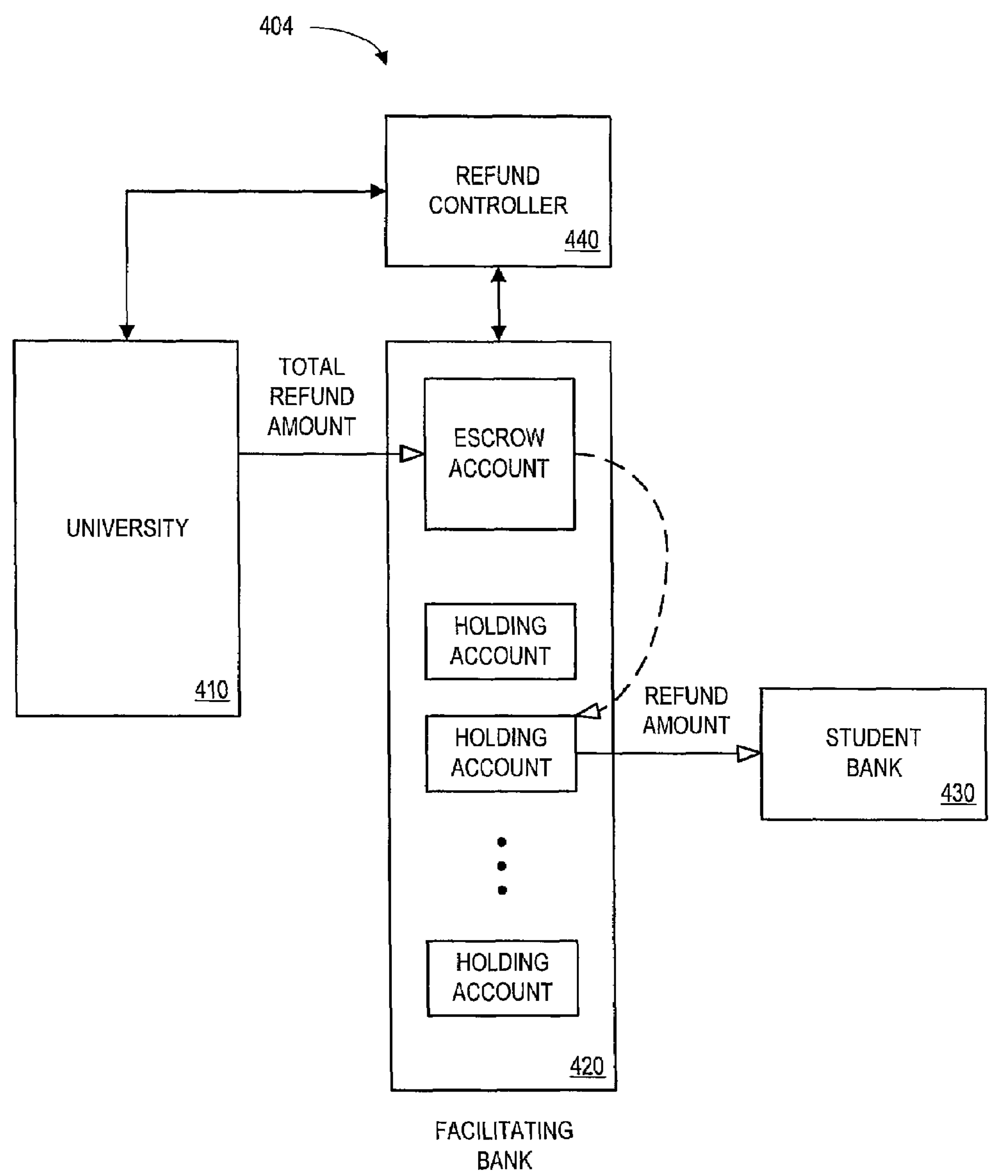

FIG. 4C illustrates a transaction 404 facilitated via a refund controller 440 according to still another embodiment. Again, a university 410 transfers a total refund amount to a facilitating bank 420 which in turn transfers refund amounts to a student bank 430 as appropriate. Moreover, the facilitating bank 420 receives additional refund information from the refund controller 440. For example, the university 410 might provide a list of student names and refund amounts to the refund controller 440, which then provides instructions to the facilitating bank 420.

In this case, the university 410 places the total refund amount in an escrow account. When the facilitating bank 420 receives instructions from the refund controller 440, refund amounts are transferred to temporary holding accounts associated with the appropriate student. For example, if the refund controller indicated that $10,000 of the total refund amount should be provided to John Smith, a holding account may be created on his behalf and $10,000 may be transferred from the escrow account to that holding account. Because each refund amount is in a separate bank account, it may be even more likely that the refunds amounts will be considered separate obligations of the facilitating bank (and therefore be separated insured). The facilitating bank 420 may then transfer the money to the appropriate student bank 430 (e.g., to John Smith's non-temporary bank account at another bank).

Figure 4D:
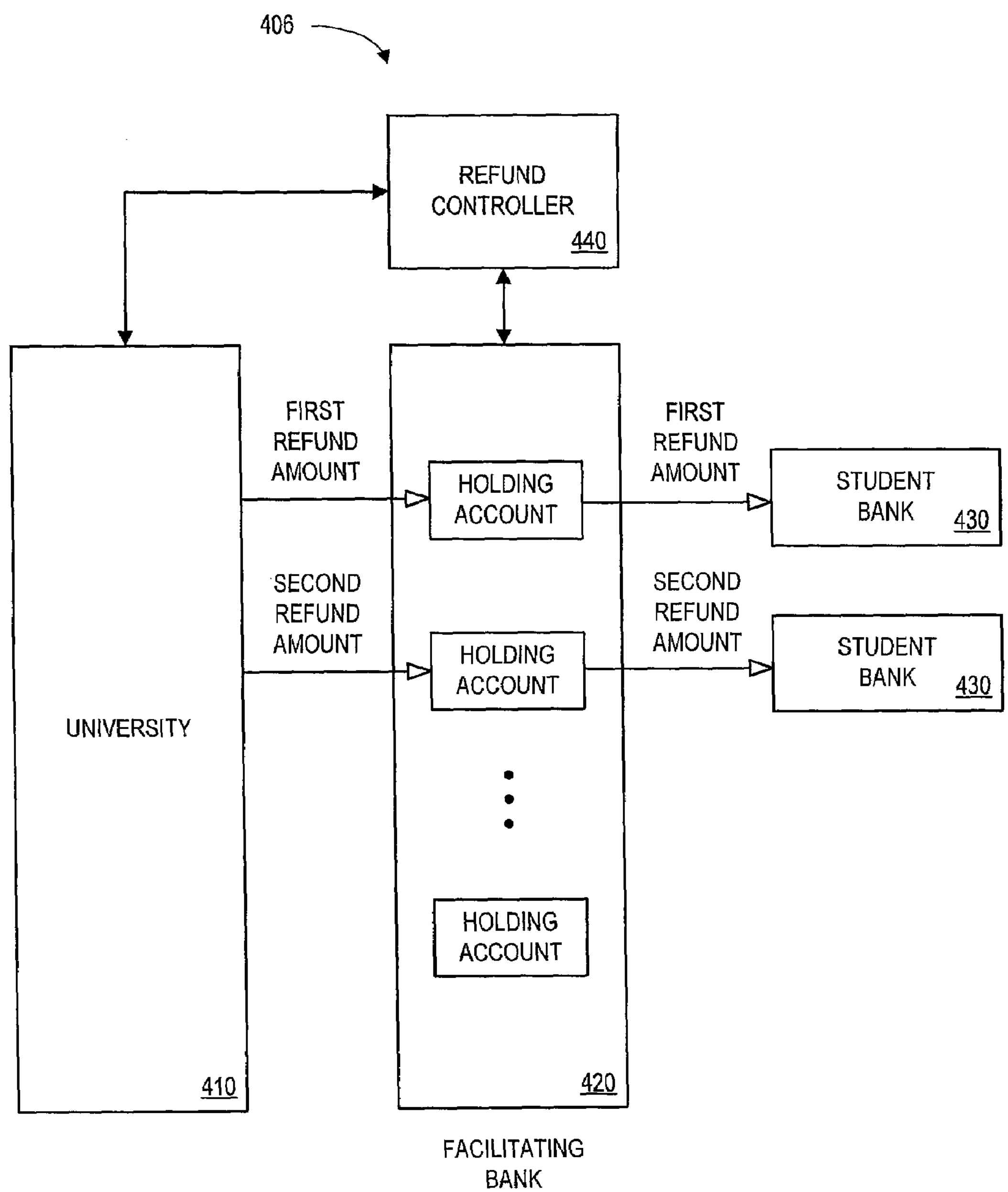

Yet another embodiment is illustrated in FIG. 4D. In this case, a transaction 406 similar to the one described with respect to FIG. C is performed. However, the university 410 transfers separate refund amounts to the separate, temporary holding accounts associated with each student (e.g., without passing through an escrow account).

Thus, the total refund amount may be deemed to be a number of different obligations of the facilitating bank 420 (e.g., by moving refund amounts to a number of different holding accounts). As a result, the amount of money associated with each obligation may be reduced (as compared to the total refund amount) and might now be adequately protected (e.g., the funds may qualify for FDIC insurance while checks are printed, mailed, and deposited by students). In some cases, the applicability of insurance may depend on the ownership rights and capacities in which a deposit account is maintained (e.g., pursuant to Section 330.3(a) of FDIC regulations). Thus, according to some embodiments, the escrow account, group holding accounts, and/or temporary holding accounts may be maintained in different rights and capacities (e.g., the holding accounts may be opened in a way that establishes the correct rights and capacities of ownership such that funds of each student will be insured separately from other accounts). Moreover, the titling of the account and the underlying deposit account records may indicate the existence of a fiduciary relationship between the facilitating bank 420 and the student.

Refund Delivery

Figure 5:
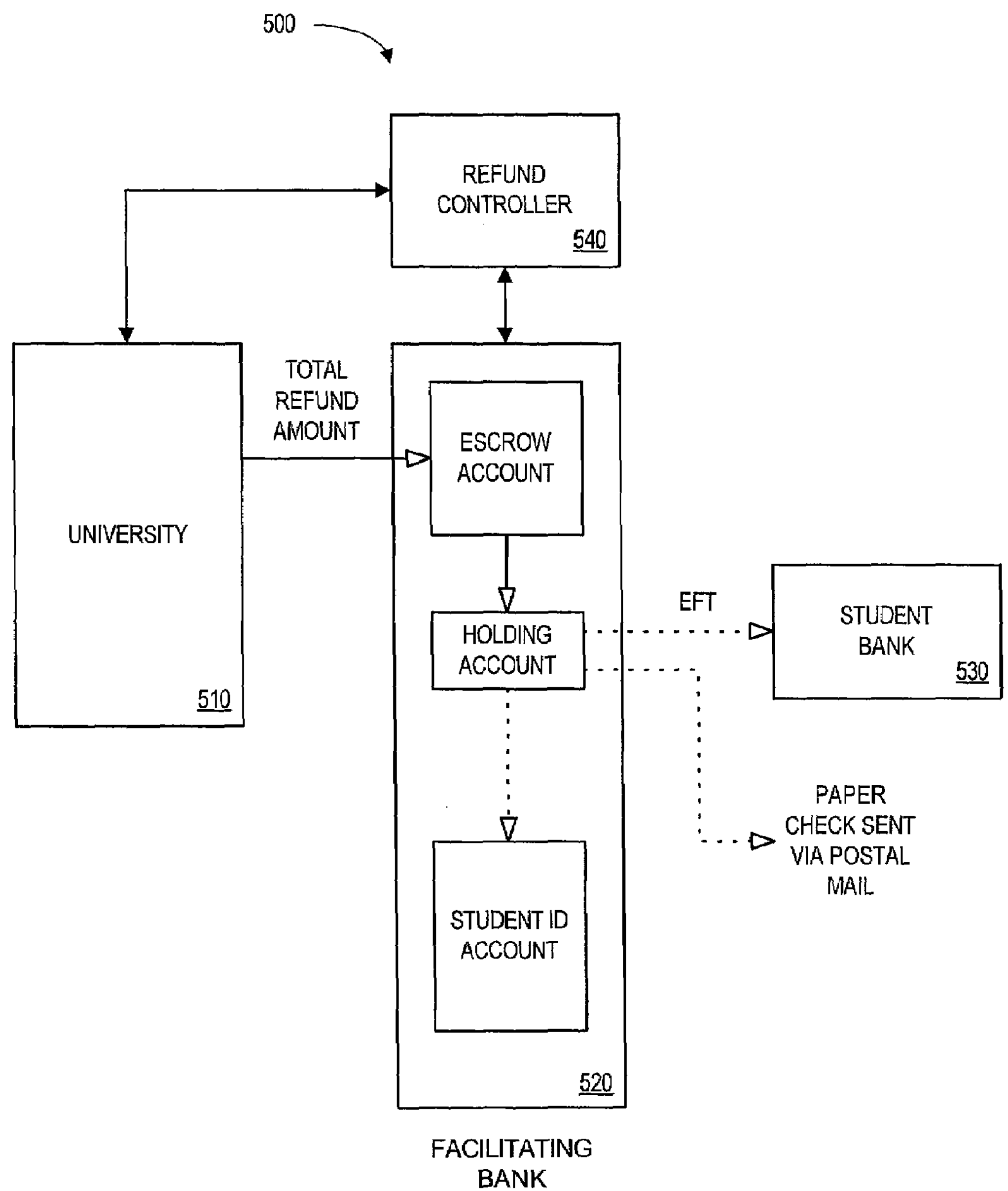
FIG. 5 illustrates a transaction according to some embodiments.

FIG. 5 illustrates a transaction 500 according to some embodiments. A university 510 transfers a total refund amount to an escrow account at a facilitating bank 520. The facilitating bank 520 may also receive instructions (e.g., from the university 510 or from a refund controller 540), such as a list of students and associated refund amounts and transfer funds from the escrow account to temporary holding accounts as appropriate.

According to this embodiment, the facilitating bank 520 also receives instructions as to a method of delivery for each student. For example, one student may want to receive his or her refund amount via a paper check that is mailed to the student's home. Another student may want the refund amount to be deposited in his or her bank 530 via an Electronic Funds Transfer (EFT) transaction. The facilitating bank 520 may then automatically arrange for the refund amount to be provided to the student in accordance with the appropriate method of delivery. As described with respect to FIGS. 10 through 20, according to some embodiments a student may indicate that his or her refund should be transferred to a non-temporary account previously established for the student at the facilitating bank 520. For example, the student may want the refund amount to be transferred to an account associated with his or her student identification card.

Figure 6:
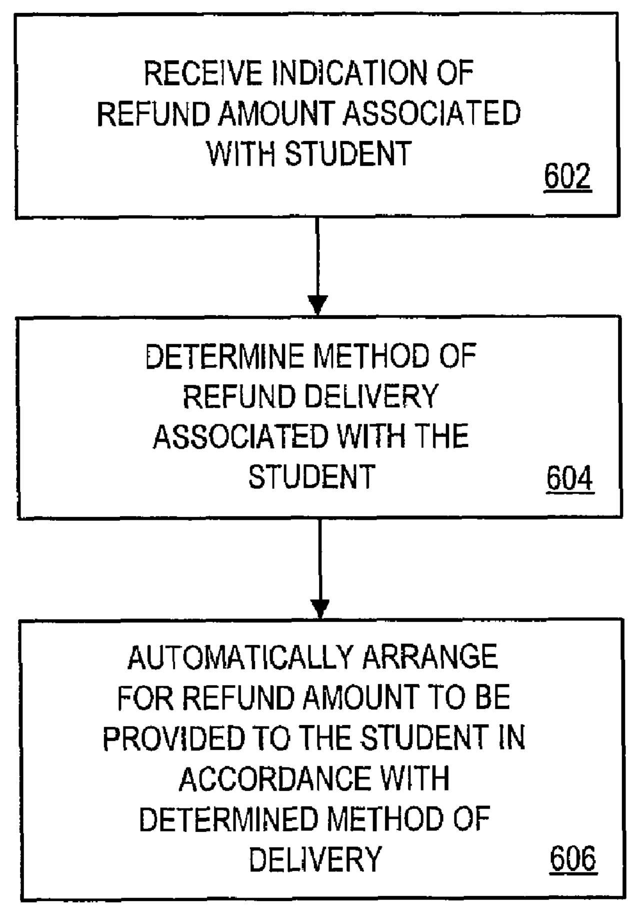
FIG. 6 is a flow chart of a method according to some embodiments.

FIG. 6 is a flow chart of a method according to an embodiment of the present invention. The flow charts in FIG. 6 and the other figures described herein do not imply a fixed order to the steps, and embodiments of the present invention can be practiced in any order that is practicable. The method shown in FIG. 6 may be performed, for example, by the refund controller 540.

At 602, an indication of a refund amount associated with a student is received from an educational institution. For example, a refund controller might receive an educational institution identifier, a student identifier, and/or an indication of the refund amount. Such information might be received periodically (e.g., a batch of refunds may be processed each night), on a refund-by-refund basis, or in any other way. Note that the educational institution may make the determination as to whether or not a refund needs to be provided to a student (as well as the amount of the refund).

According to some embodiments, the received information is verified. For example, a refund controller might compare refund amounts associated with a number of different students to an amount that currently available in an escrow account. Similarly, a refund controller might compare a refund amount to a pre-determined threshold limit (e.g., to determine if the refund amount will qualify for FDIC insurance when it is deposited into a holding account) or compare a student identifier with a list of existing student identifiers. As another example, the received information is verified to determine if there has been an error in the transmission or receipt of the information (e.g., a hash value or checksum might be calculated).

At 604, a method of refund delivery associated with the student is determined. For example, a refund controller may access a database to determine how that student would like to receive his or her refund.

At 606, it is automatically arranged for the refund amount to be provided to the student in accordance with the determined method of delivery. For example, a refund controller might provide instructions to a facilitating bank. In this way, refund transactions may be efficiently processed, helping a university comply with any timeliness requirements. According to some embodiments, the refund amount may be transferred to a credit account associated with the student (e.g., having a line of credit available to the student).

Although the method of FIG. 6 has been described as being performed by a refund controller, note that some or all of the steps might instead be performed by a facilitating bank and/or a university.

Refund Controller

Figure 7:
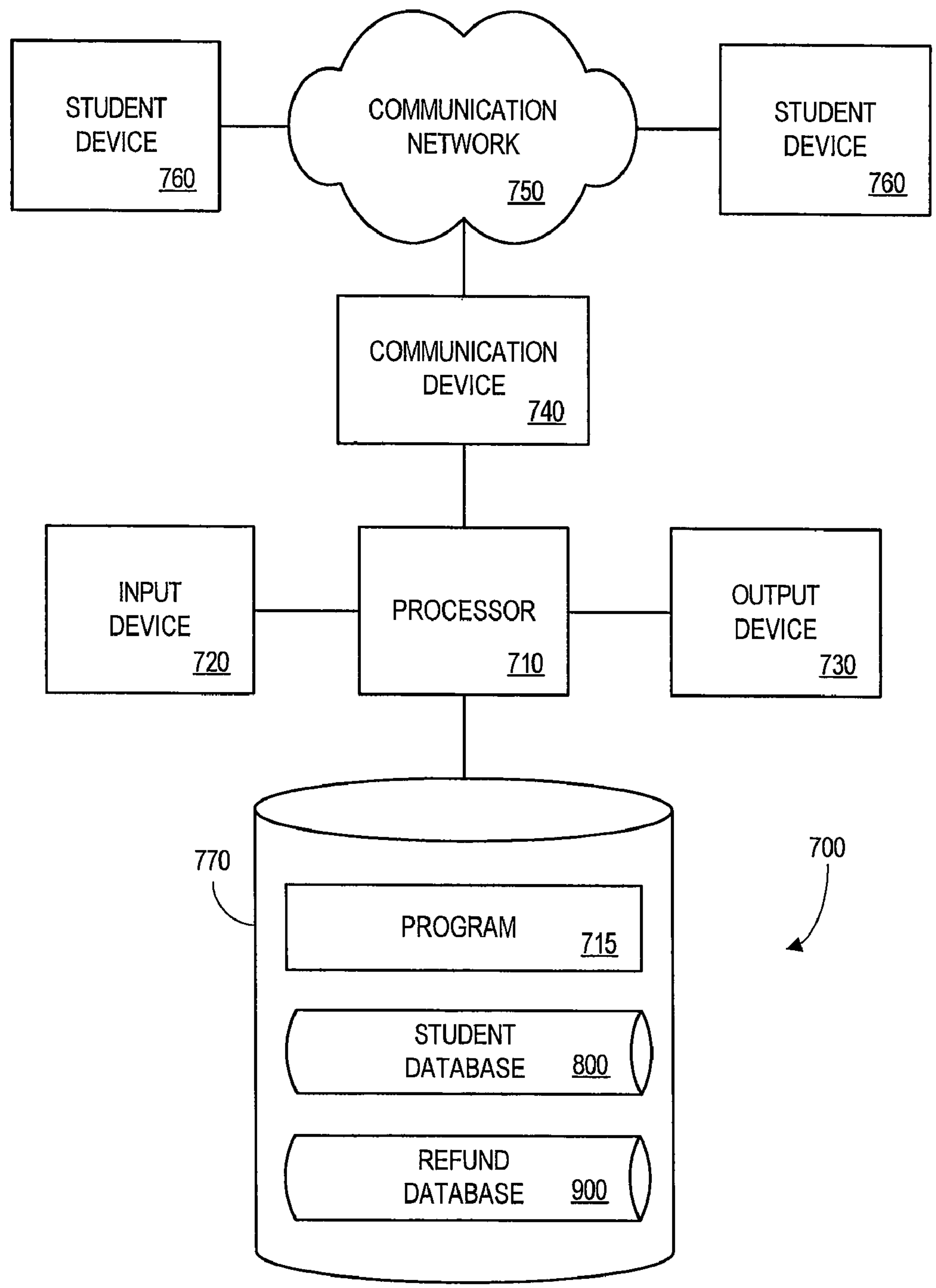
FIG. 7 is a block diagram of a system including a refund controller according to one embodiment.

FIG. 7 is a block diagram of a system 700 including a refund controller according to one embodiment. The refund controller may, for example, communicate with student device 760 via a communication network 750. As used herein, devices (such as the refund controller and the student devices 760) may communicate via one or more communication networks, such as a Local Area Network (LAN), a Metropolitan Area Network (MAN), a Wide Area Network (WAN), a proprietary network, a Public Switched Telephone Network (PSTN), a Wireless Application Protocol (WAP) network, a wireless LAN (e.g., in accordance with the Institute of Electrical and Electronics Engineers 802.11 standard), or an Internet Protocol (IP) network such as the Internet, an intranet or an extranet.

The refund controller and student devices 760 may be any types of devices capable of performing the functions described herein. The refund controller may be associated with, for example, a Web server. A student device 760 may comprise, for example, his or her PC, a portable computing device, such as a Person Digital Assistant (PDA), a telephone, or a television device.

Other devices may also be included in the system 700. For example, the refund controller may also communicate with an educational institution device and/or a facilitating bank device via the communication network 750. An educational institution device may be associated with, for example, a university's Enterprise Resource Planning (ERP) system. As used herein, the phrase "ERP system" may refer to any of a broad set of activities supported by application software that helps an educational institution manage parts of its business, including software for the financial and human resources aspects of a business. Typically, an ERP system uses (or is integrated with) a relational database system. The educational institution device may store, for example, student information (e.g., a Social Security number, a home address, a school address, financial aid information, and an anticipated date of graduation), staff information (e.g., faculty salary), financial aid information, and/or registrar information. Note that the educational institution device might also be associated with an on-campus (i.e., primarily on-campus) identification card transaction network.

Although a single refund controller is shown in FIG. 7, any number of refund controllers may be included in the system 700. Similarly, a single device may act as more than one of the devices described herein. For example, a single computer network may serve as both a refund controller and a facilitating bank device.

Note that the devices described herein need not be in constant communication. For example, the refund controller may communicate with an educational institution device on an as-needed or periodic basis.

The refund controller comprises a processor 710, such as one or more INTEL® Pentium® processors, coupled to a communication device 740 configured to communicate via the communication network 750. The communication device 740 may be used to communicate, for example, with educational institution devices, credit service devices, student devices 760, merchant devices, banking devices, and/or other refund controllers. The refund controller may also include an input device 720, such as keyboard (e.g., to provide refund search information) and/or an output device 730, such as a monitor or printer (e.g., to provide refund reports).

The processor 710 is also in communication with a storage device 770. The storage device 770 may comprise any appropriate information storage device, including combinations of magnetic storage devices (e.g., magnetic tape and hard disk drives), optical storage devices, and/or semiconductor memory devices such as Random Access Memory (RAM) devices and Read Only Memory (ROM) devices.

The storage device 770 stores a program 715 for controlling the processor 710. The processor 710 performs instructions of the program 715, and thereby operates in accordance with the present invention. For example, the processor 710 may receive an indication of a refund amount associated with a student of an educational institution. The processor 710 may the determine a method of refund delivery associated with the student and automatically arrange for the student to receive his or her refund.

As used herein, information may be "received" by or "transmitted" to, for example: (i) the refund controller from another device; or (ii) a software application or module within the account from another software application, module, or any other source.

The storage device 730 also stores a student database 800 (described with respect to FIG. 8) and a refund database 900 (described with respect to FIG. 9). The illustrations and accompanying descriptions of the databases presented herein are exemplary, and any number of other database arrangements could be employed besides those suggested by the figures.

Student Database

FIG. 8 is a tabular representation of a portion of a student database 800 according to one embodiment. The table includes entries identifying students of an educational institution. The table also defines a student identifier 802, a student name 804, an educational institution 806, an account type 808, a refund transfer preference 810, and additional transfer information 812 for each of the entries. Some of the information in the student database 800 may be created and updated, for example, based on information received from educational institution and/or student devices.

The student identifier 802 may be, for example, an alphanumeric code associated with a particular student (e.g., a Social Security number or a user name and password). The student name 804 indicates the student who is associated with that identifier, and the educational institution 806 represents that student's university. The account type 808 may indicate, for example whether the bank account is "soft" (e.g., the account has not been accepted by the student) or "activated."

The student database 800 also includes a refund transfer preference 810 for the student (e.g., indicating that he or she prefers to receive refunds via a paper check or an EFT transaction) along with additional transfer information 812. The additional transfer information might include, for example, an address to which paper checks should be mailed or a bank account identifier.

In addition to the information illustrated in FIG. 8, other information might also be stored in the account database 800. For example, an address, a telephone number, and/or an electronic mail address may be stored. Similarly, a date of birth and anticipated graduation date might be stored in the student database 800.

Refund Database

FIG. 9 is a tabular representation of a portion of a refund database 900 according to one embodiment. The table includes entries identifying refunds that will be (or have been) provided to students. The table also defines a refund identifier 902, a student identifier 904, an educational institution or escrow account identifier 906, a refund amount 908, a refund status 910, and/or a refund history 912 for each of the entries. Some of the information in the refund database 900 may be created and updated, for example, based on information received from educational institution and/or facilitating bank devices.

The refund identifier 902 may be, for example, an alphanumeric code associated with a particular refund. The student identifier 904 may indicate which student should receive the refund and the educational institution 906 may indicate his or her school. The refund amount 910 may represent the amount of money he or she is entitled to receive, and the refund status 910 may indicate whether or not the refund has been provided to the student. The refund history 912 might include, for example, a date or time when the transfer of the refund amount was complete.

EXAMPLE

One example of a refund method and process will now be provided. Note that the acquisition of customers by a bank or other financial institution can be difficult. For example, banks typically encounter high customer acquisition costs and slow adoption rates by target audiences. In addition, the products and services offered by banks have become commodities (making price an important means of competition).

Many college-age students already have at least some type of financial relationship with their educational institution. For example, a student may pay tuition and/or receive financial aid via the university. Note that the acquisition of college-age students can be especially important for a bank, because a person at this age is often establishing his or her first banking relationship. It can be difficult, however, for a bank to effectively target advertising and other promotional material to college-age students.

One known type of financial relationship between a student and an educational institution is via a campus identification card. For example, a student may store fifty dollars on a campus identification card to be used when making copies in a school library and/or minor purchases from an on-campus or local merchant. However, this a stored-value approach is limited in scope. That is, many types of banking services cannot be provided via a stored-value card (e.g., the ability to write checks).

It is also known that an educational institution can create a more complicated campus identification program, often referred to as a "onecard" system, to let a student use a single card as a form of identification, a financial instrument, a room or building key, and a meal ticket. For example, the educational institution might create an on-campus, closed transaction network that includes vending machines, laundry machines, Point Of Sale (POS) terminals, photocopiers, and/or computer printing stations. These various purchase points might be wired to a central server that executes software to process transactions, track balances, and/or control privileges. A student may load money onto his or her account (e.g., by giving money to the school), and the server can then track how the money is spent.

Also note that online banks may be particularly interested in acquiring college-age students. For example, college-age students are more likely to have experience with, and access to, online services as compared to other people. Thus, college-age students are often the most likely adopters of online banking services.

According to some embodiments, information associated with an educational institution member is received via an educational institution. For example, an account controller may receive from an educational institution device a batch of information associated with a number of different students and/or employees. For each member, the received information may include, for example, a Social Security number, a member identification number, a name, a date of birth, a permanent address (e.g., a student's home address), a permanent telephone number, a student/local address (e.g., where the student lives during the school year), a student/local telephone number, a graduation date, a status (e.g., indicating if the student is currently enrolled), a major, an electronic mail address, a drivers license number, a passport number, citizenship information, barcode information (e.g., associated with a bar code on a university identification card), a parent name, a parent address, image information (e.g., a picture of the student), and/or an educational institution identifier.

A bank account may then be created for the member based on the received information. For example, an account controller might create demand deposit accounts for students based on the received information. According to one embodiment, the created bank accounts are associated with a university identification card. That is, a single card may act as both: (i) a form of university identification, and (ii) a banking card.

Figure 10:
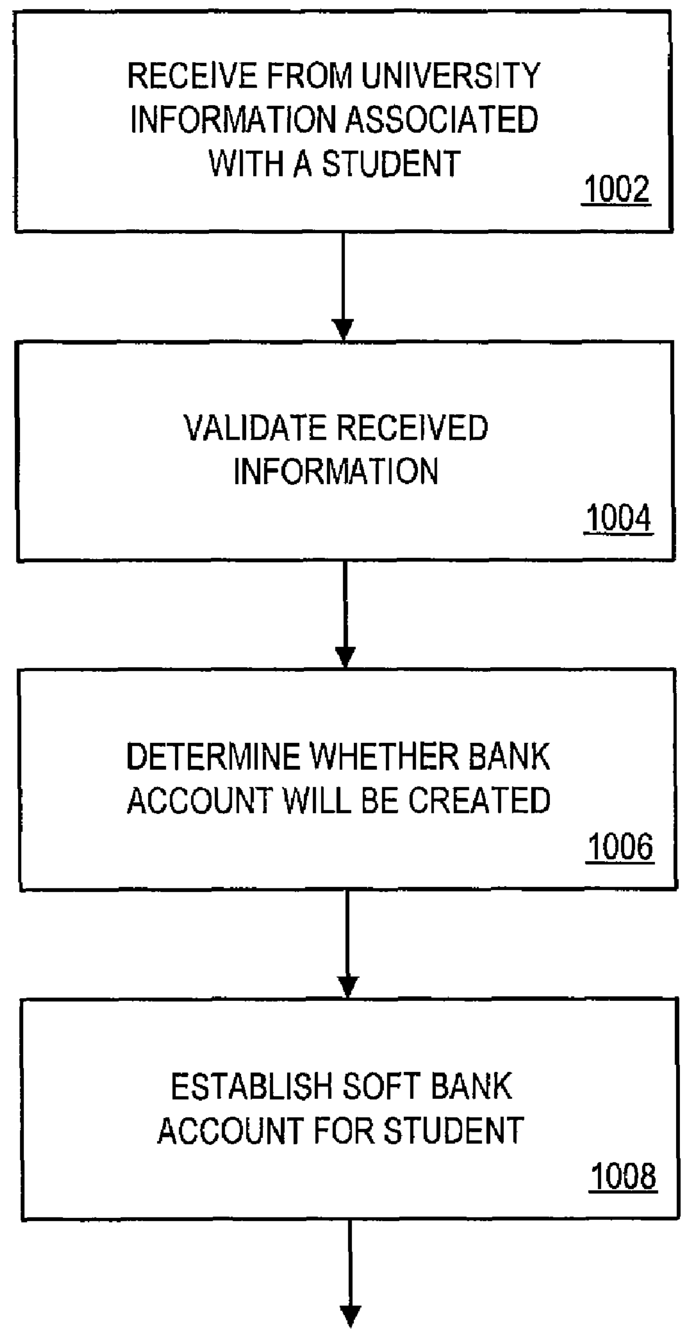
FIGS. 10 and 11 comprise a flow chart of a method according to some embodiments.
Figure 11:
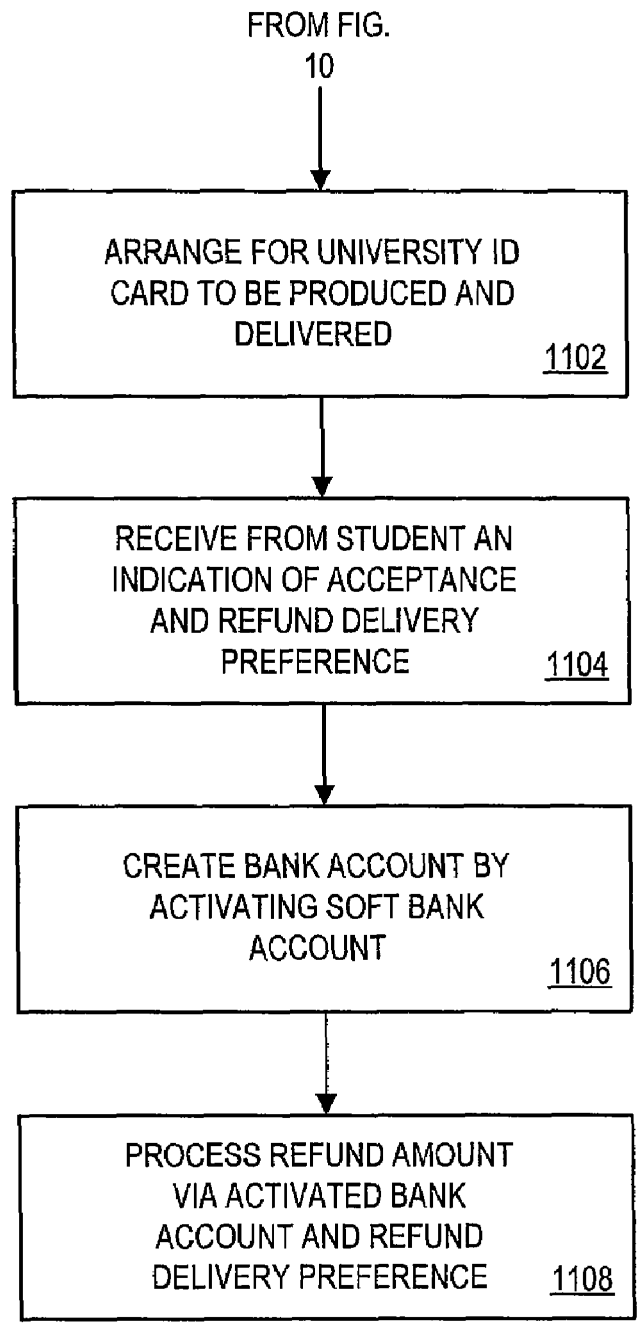

FIGS. 10 and 11 comprise a flow chart of a method according to this embodiment. At 1002, information associated with a student is received from a university (e.g., via an educational institution device). The received information is then validated at 1004. For example, the received information may be reviewed by an operator and/or an automated process.

At 1006, it is determined whether or not a bank account will be created based on the received information. For example, an account controller may communicate with a credit service device to determine if an account will be created for a particular student (e.g., based on that student's credit rating).

At 1008, a "soft" bank account is established for the student based on the received information. As used herein, establishing a "soft" bank account might mean, for example, that the student does not yet have access to the account. Instead, information may simply be stored to facilitate a subsequent creation (or activation) of an actual bank account for the student (i.e., an actual account that the student can access).

At 1102, it is arranged for a university identification card associated with the student to be produced and delivered (e.g., to the educational institution or the student). Note that the card itself may be produced by a third party. According to other embodiments, a different token of identification is produced instead (e.g., a unique number or a MOBIL SPEEDPASS® device). As still another example, a smart card or other device might generate encrypted codes representing a party and/or a value associated with a party.

An indication of acceptance associated with the student is then received at 1104 along with a refund delivery preference. For example, an account controller might receive the indication of acceptance and refund delivery preference via a student device (e.g., the student's PC or telephone). According to one embodiment, the indication of acceptance includes security information (e.g., a code that was provided to the student via postal mail). Note that this information might also be received via an educational institution device.

In response to the indication of acceptance, a bank account is created at 1106 by activating the soft bank account. A refund amount can then be processed for the student via the bank account at 1108 (e.g., the refund amount may be deposited into the bank account that was created at 1106 because that was the student's preference). According to some embodiments, other educational institution transactions are also processed via the bank account. Such transactions might be associated with, for example, a meal plan, textbooks, and/or an on-campus or off-campus purchase.

According to some embodiment, a transfer of payment with an educational institution is arranged. For example, a university might provide payment in exchange for facilitating a transfer of a refund amount to a student (e.g., on a refund-by-refund basis) for facilitating a transfer of refund amounts to a plurality of students (e.g., with a fixed monthly payment).

Displays

Figure 12:
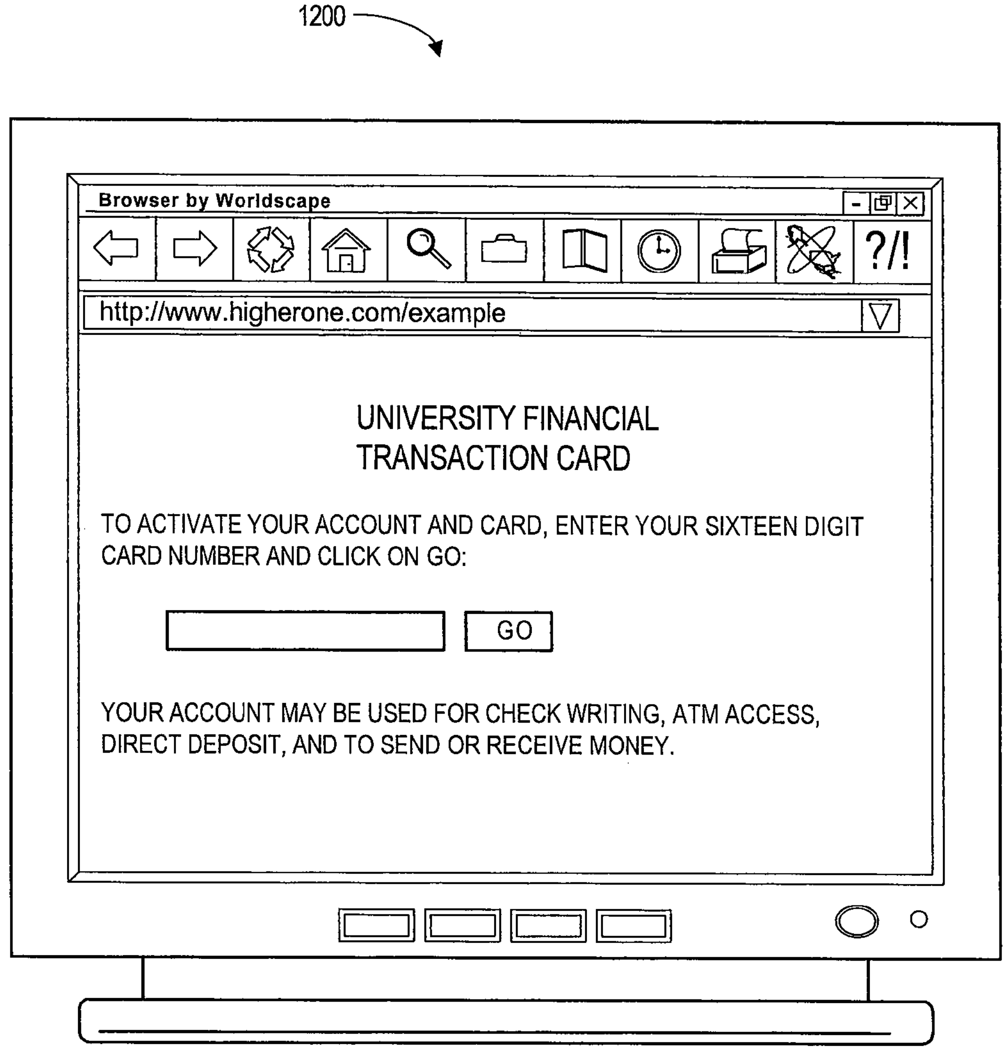
FIGS. 12 through 20 illustrate student device displays according to some embodiments.

FIGS. 12 through 20 illustrate student device displays according to some embodiments that may be provided via student devices 760 and/or other devices according to some embodiments. In particular, FIG. 12 illustrates a display 1200 that may be used by a student who is interested in activating his or her account. In this case, the student (who has already received a physical card) enters a sixteen digit card number to initiate activation.

Figure 13:
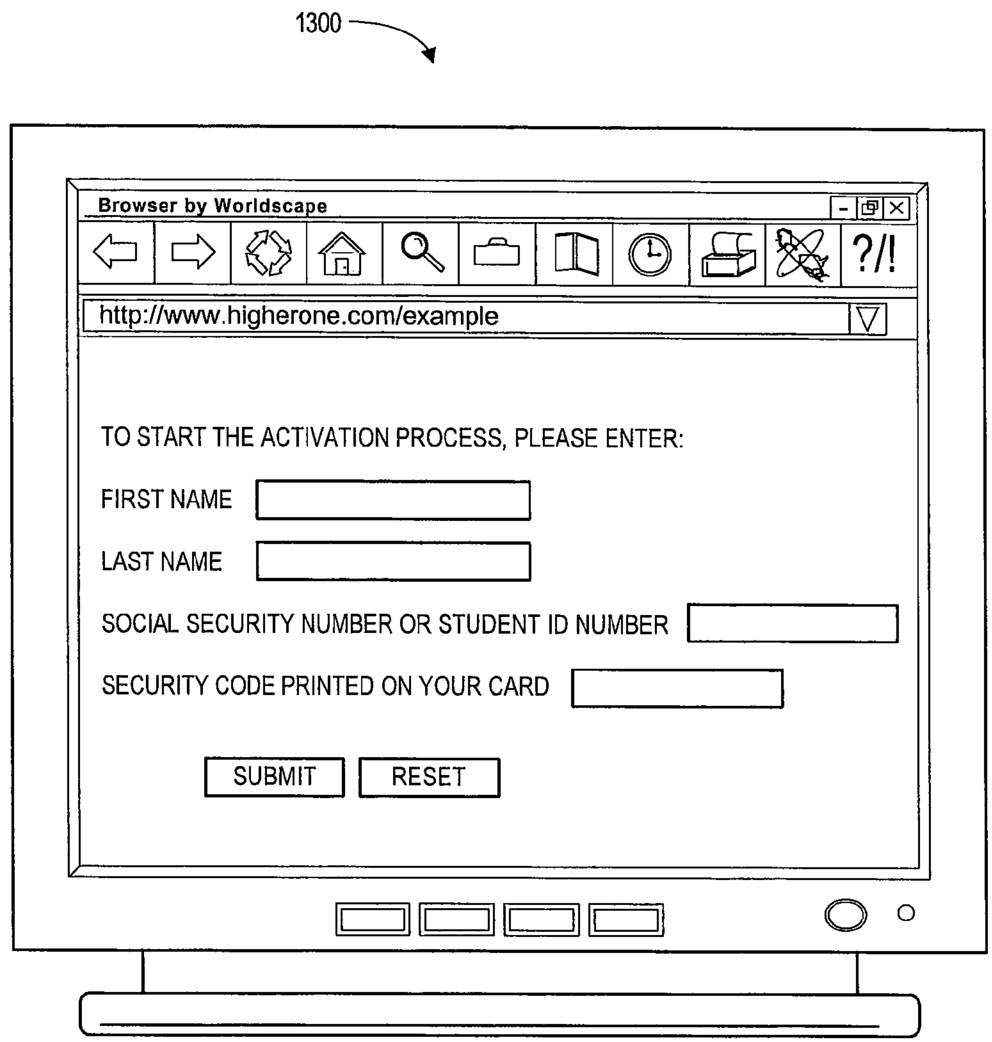
Figure 14:
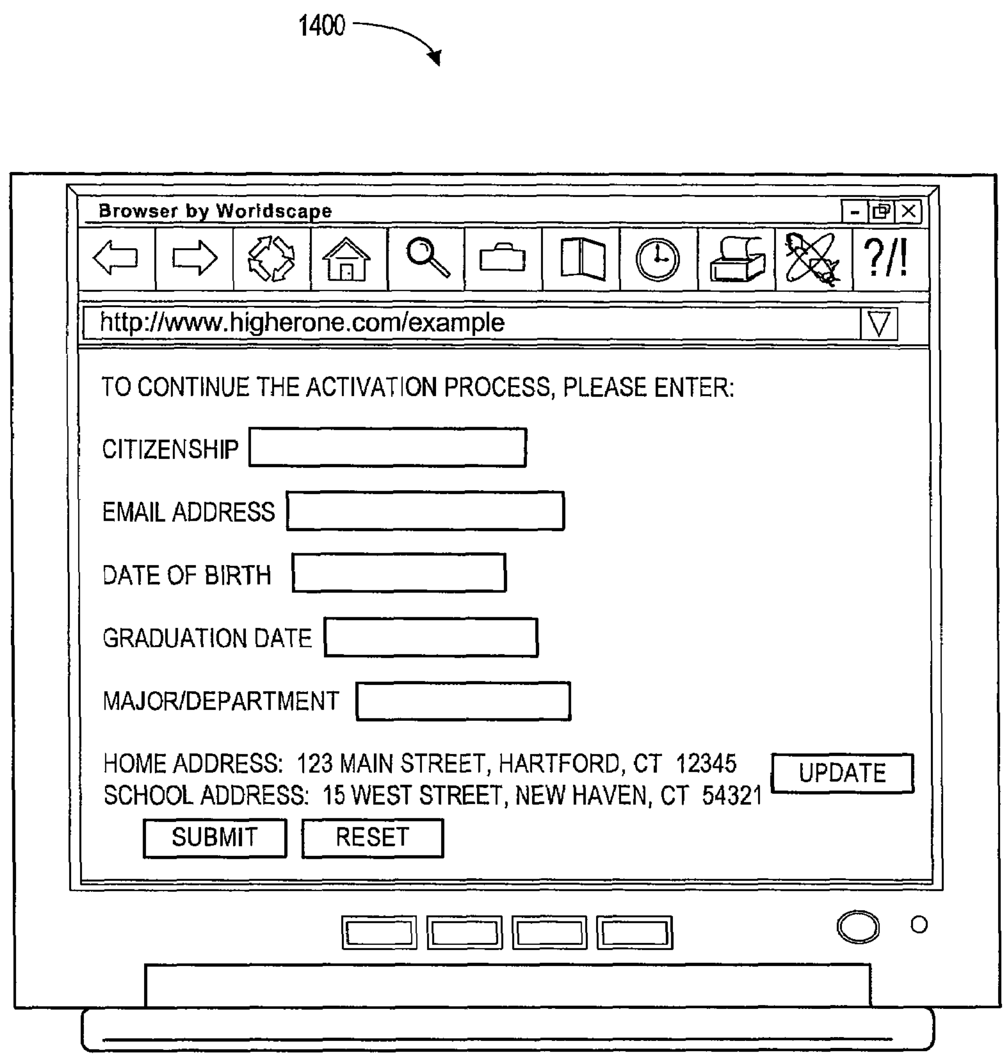

After entering the card number, the student uses the display 1300 illustrated in FIG. 13 to provide his or her name, Social Security number, and a security code printed on his or her card. The display 1400 illustrated in FIG. 14 may then be used to provide the student's citizenship information, email address, date of birth, anticipated graduation date, and major or department. This display 1400 may be used to verify (and, if needed, to update) the student's home and school address.

Figure 15:
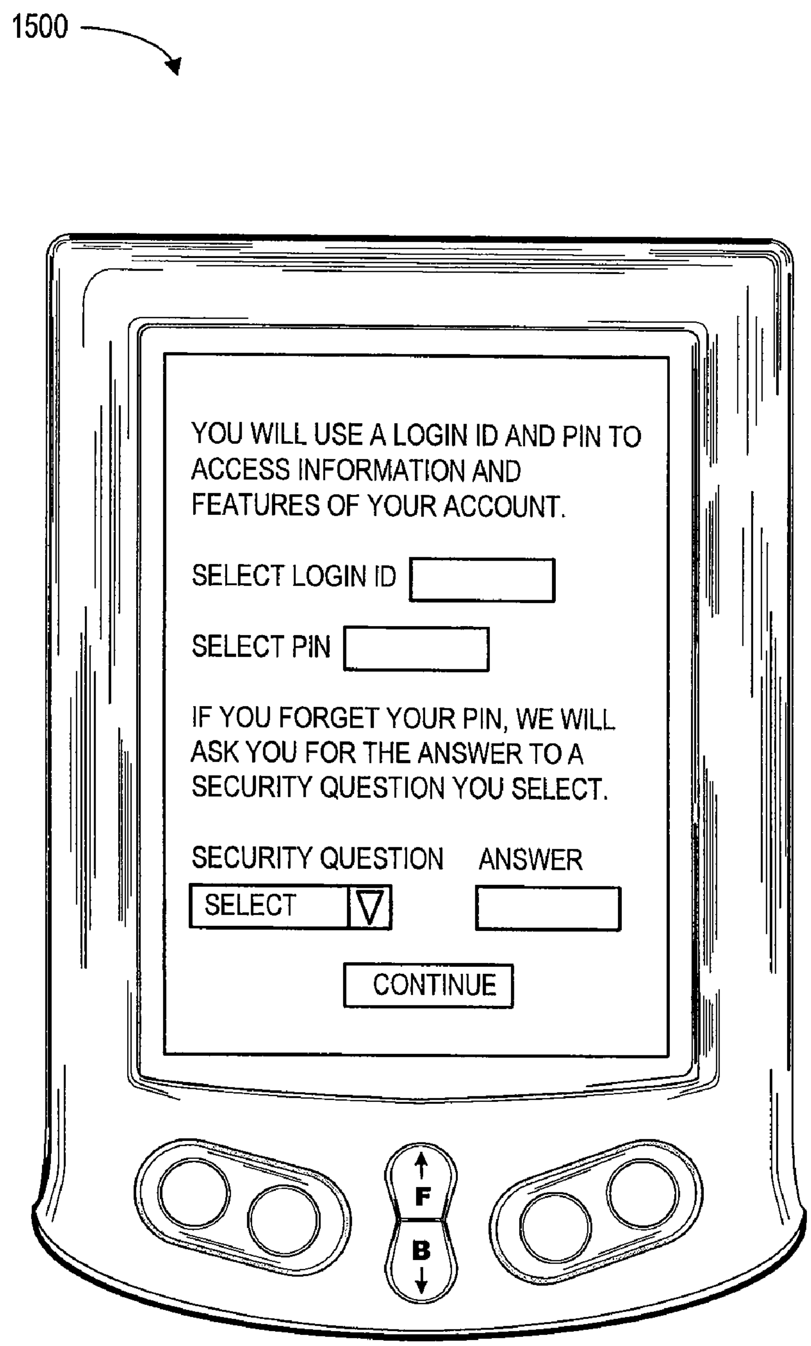

FIG. 15 illustrates a display 1500 that can be used by a student to create a login identifier (ID) and Personal Identification Number (PIN) that he or she can used to access information about the account. Note that the display 1500 is illustrated on a PDA, but any type of student device 760 may be used.

Figure 16:
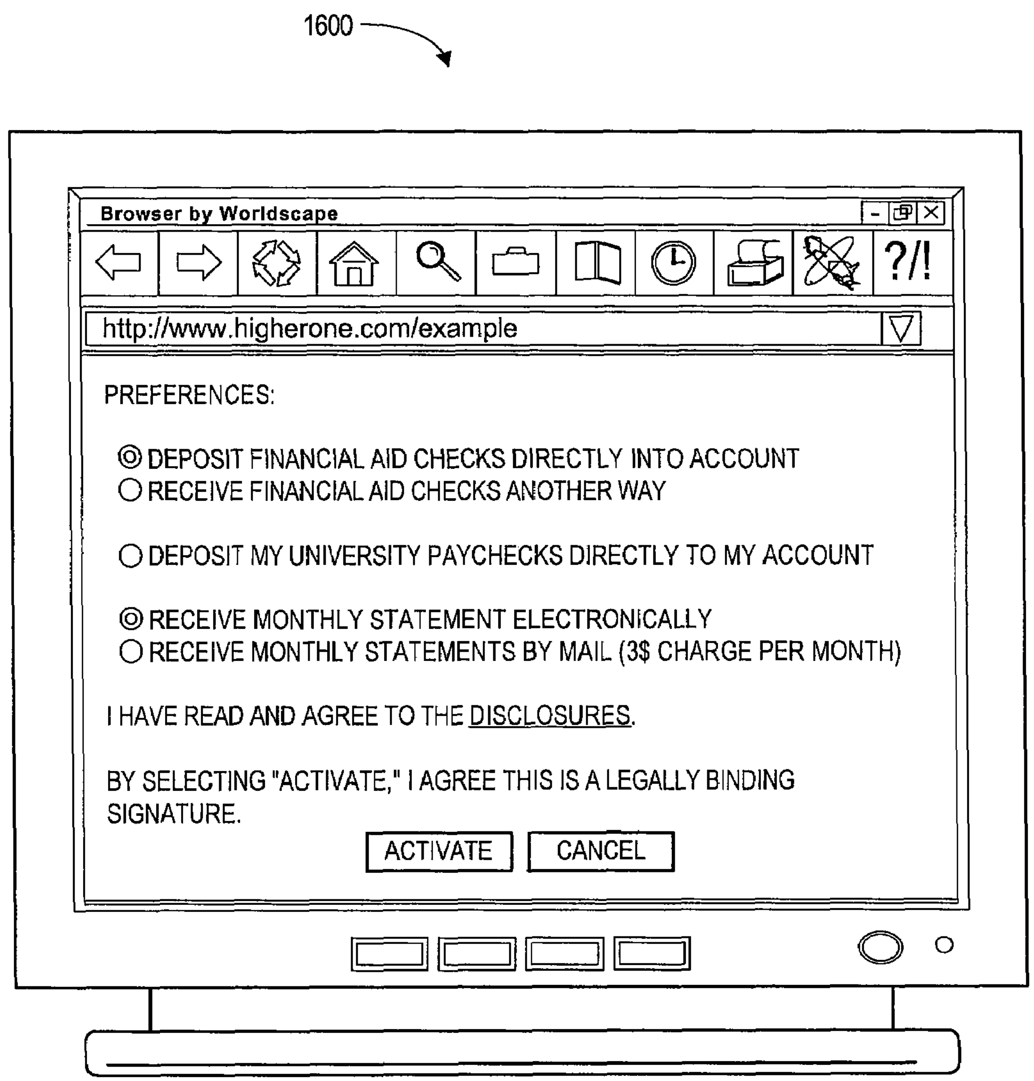

FIG. 16 illustrates a display 1600 that can be used by a student to set up account preferences. In particular, the student can elect whether or not financial aid checks should be deposited directly into his or her account. In the case of a university employee, he or she can determine if paychecks should be deposited directly into the account.

Figure 17:
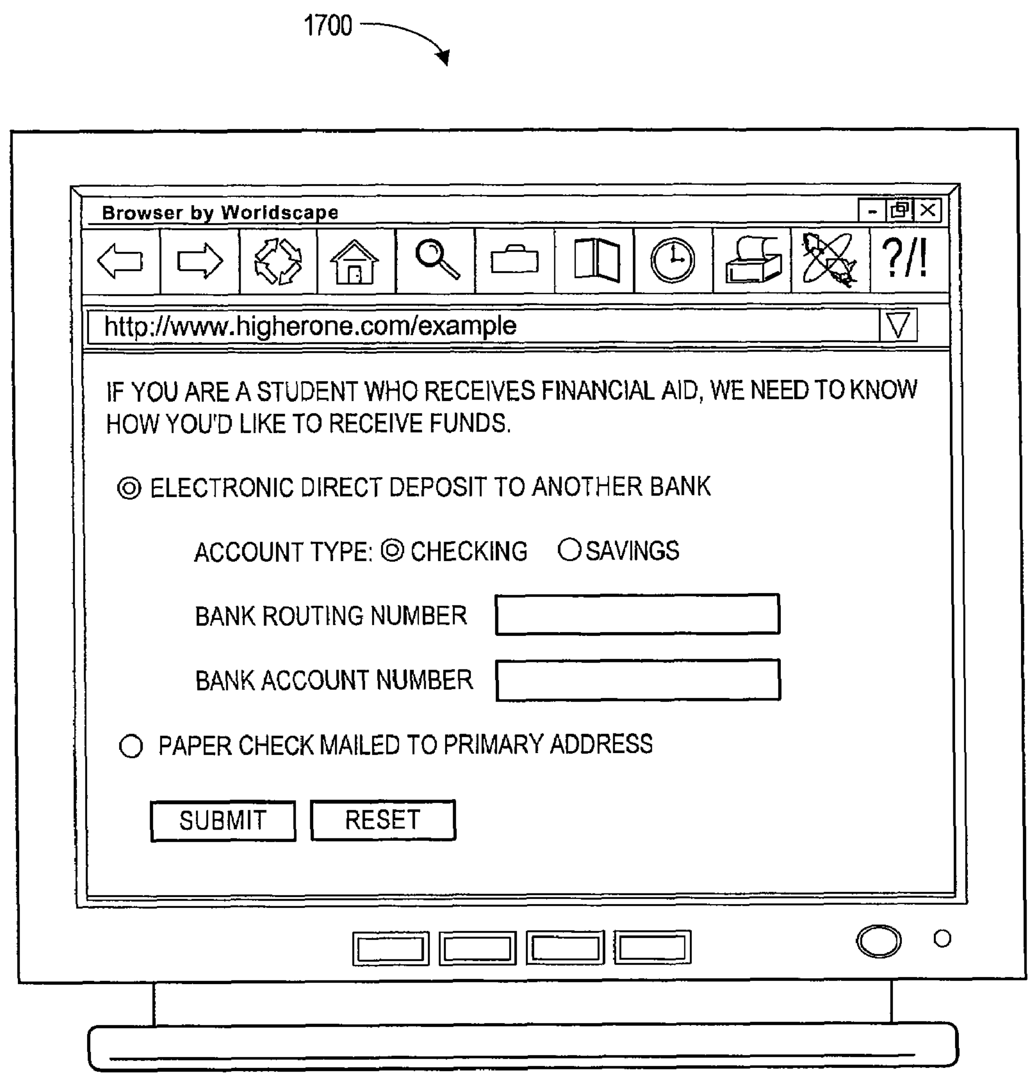
Figure 18:
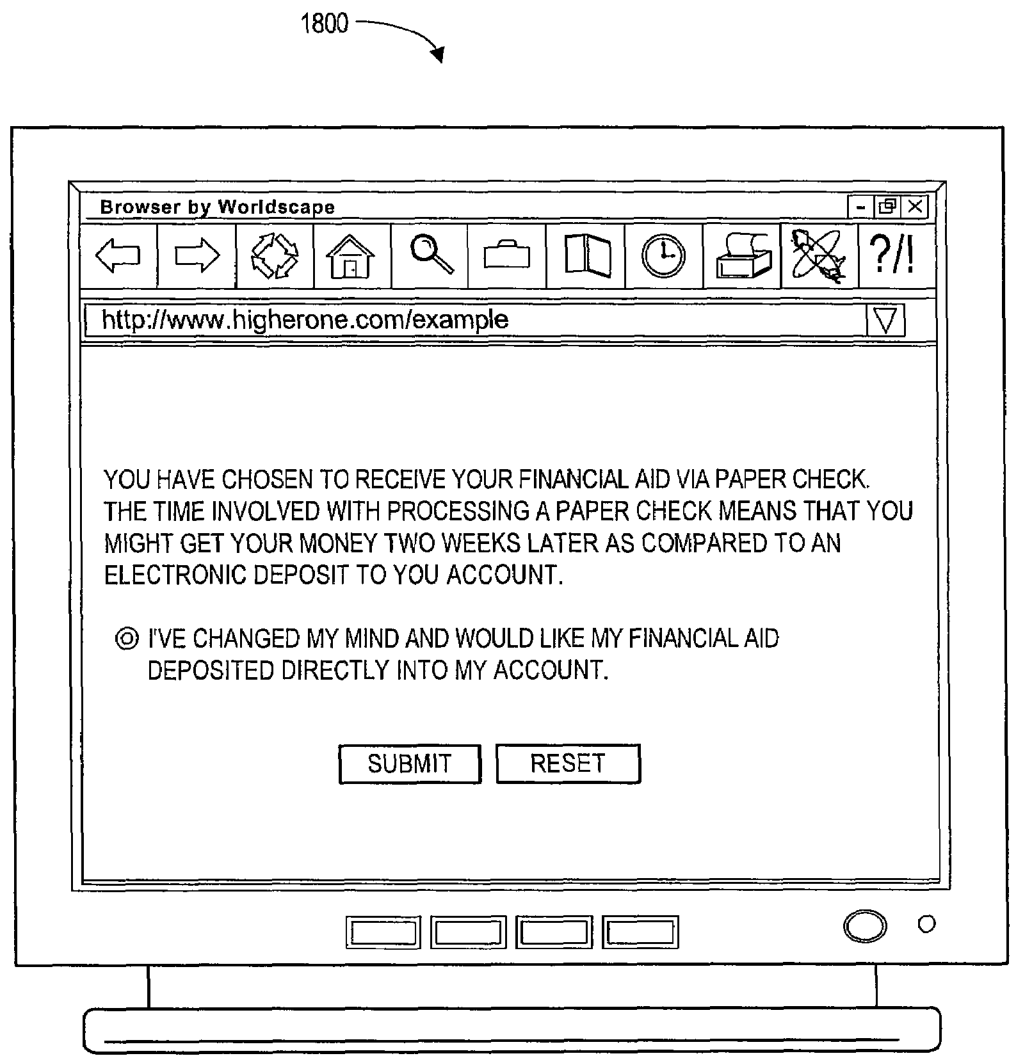

FIG. 17 illustrates a display 1700 that can be used by a student who does not want financial aid checks to be deposited directly into his or her account. In this case, the student might provide bank routing and account numbers associated with another bank or elect to have a paper check sent via postal mail. FIG. 18 illustrates a display 1800 that can be used to encourage a student to have financial aid checks deposited directly into his or her account.

Figure 19:
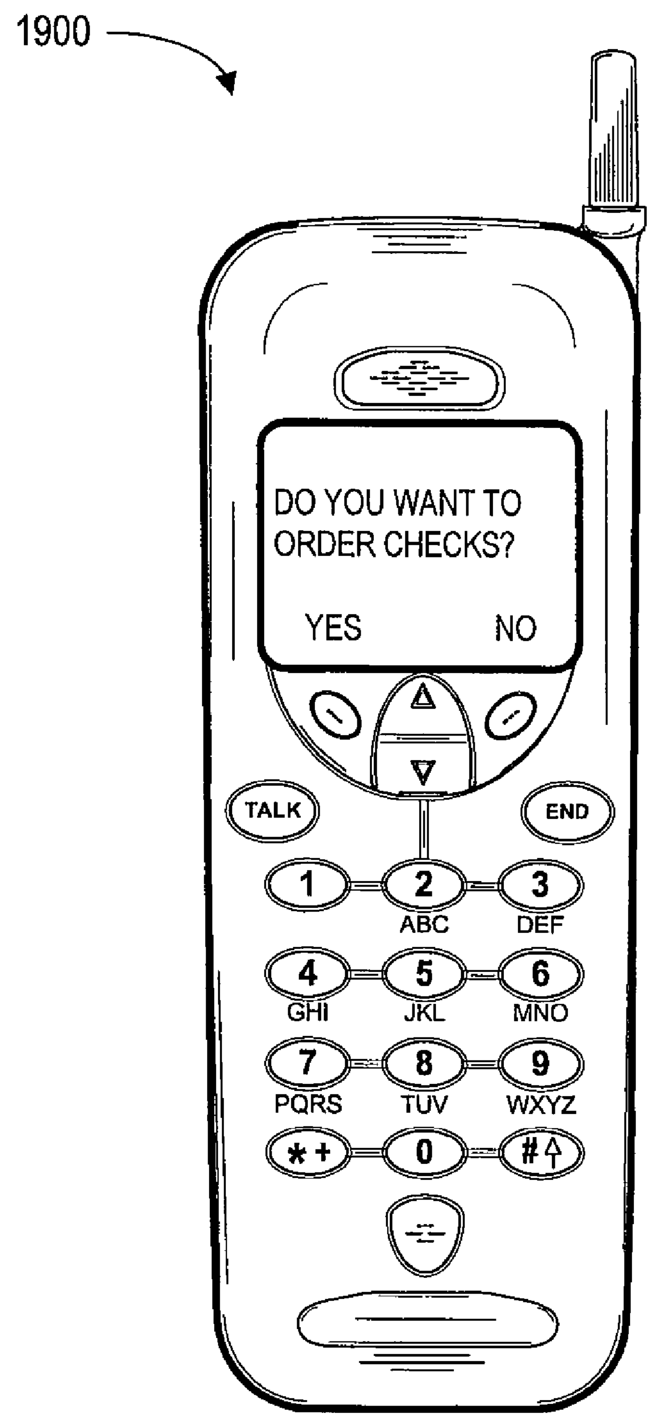

FIG. 19 illustrates a display 1900 that can be used by a student to order checks for his or her account. Note that the display 1900 is illustrated on a wireless telephone, but any type of student device 760 may be used.

Figure 20:
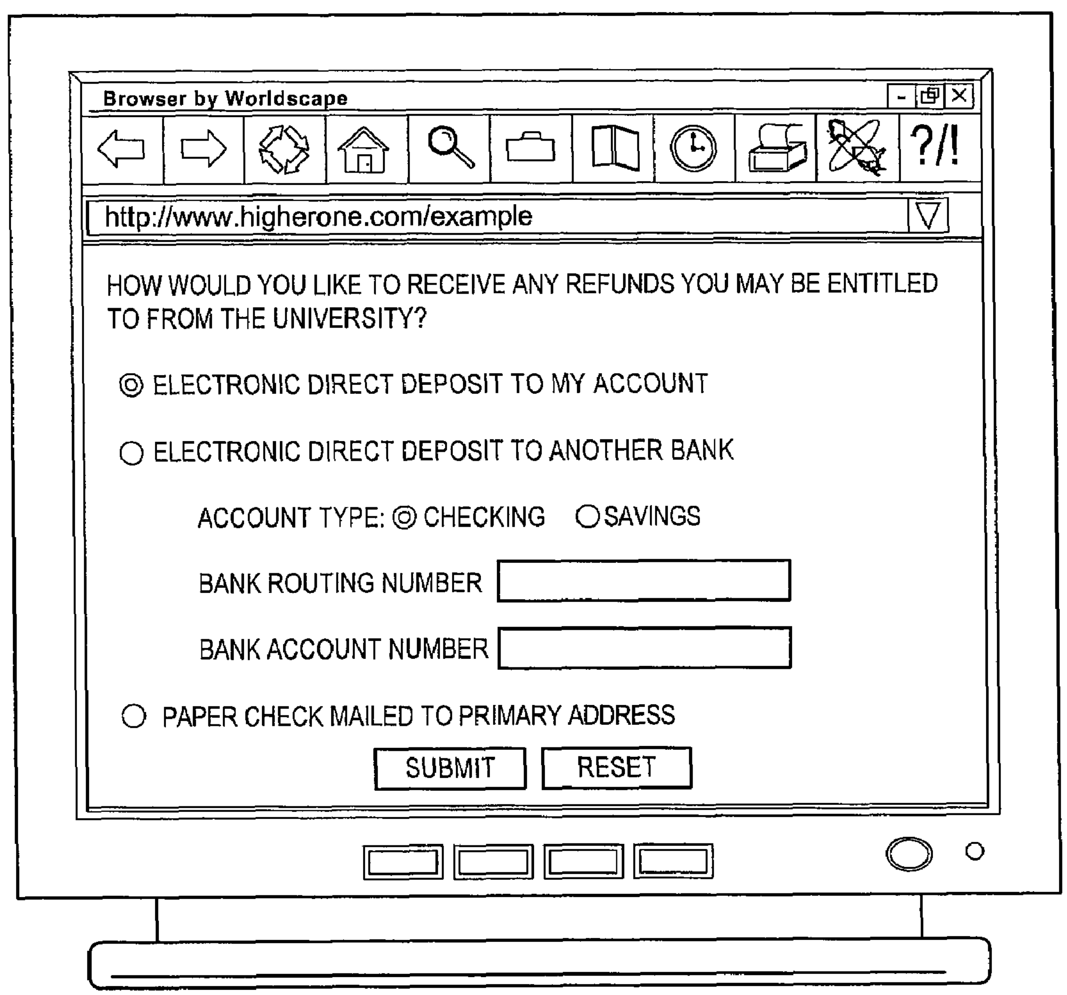

FIG. 20 illustrates a display 2000 that can be used by a student to select a refund amount preference (e.g., whether or not refunds from the university should be deposited directly into his or her account). If the student does not want the refunds to be deposited directly into his or her account, bank routing and account numbers associated with another bank may be provided or the student may elect to have a paper check sent via postal mail.

According to some embodiments, other displays provide to a student an explanation of how his or her account may be used. Such displays might indicate, for example, that funds can be added to the account by: (i) depositing money electronically from another bank account, (ii) depositing a paper check, (iii) inviting someone to send money to the account, (iv) arranging for a paycheck to be deposited into the account, and/or (v) arranging for the university to put money it owes to the student into the account. Similarly, the display might indicate that funds can be accessed via: (i) spending on campus, (ii) spending wherever VISA® or MASTERCARD® credit cards are accepted, and/or (iii) an ATM device. Other information might also be included on the display, such as information about a rewards program and/or answers to frequently asked questions.

Refund Searches

Figure 21:
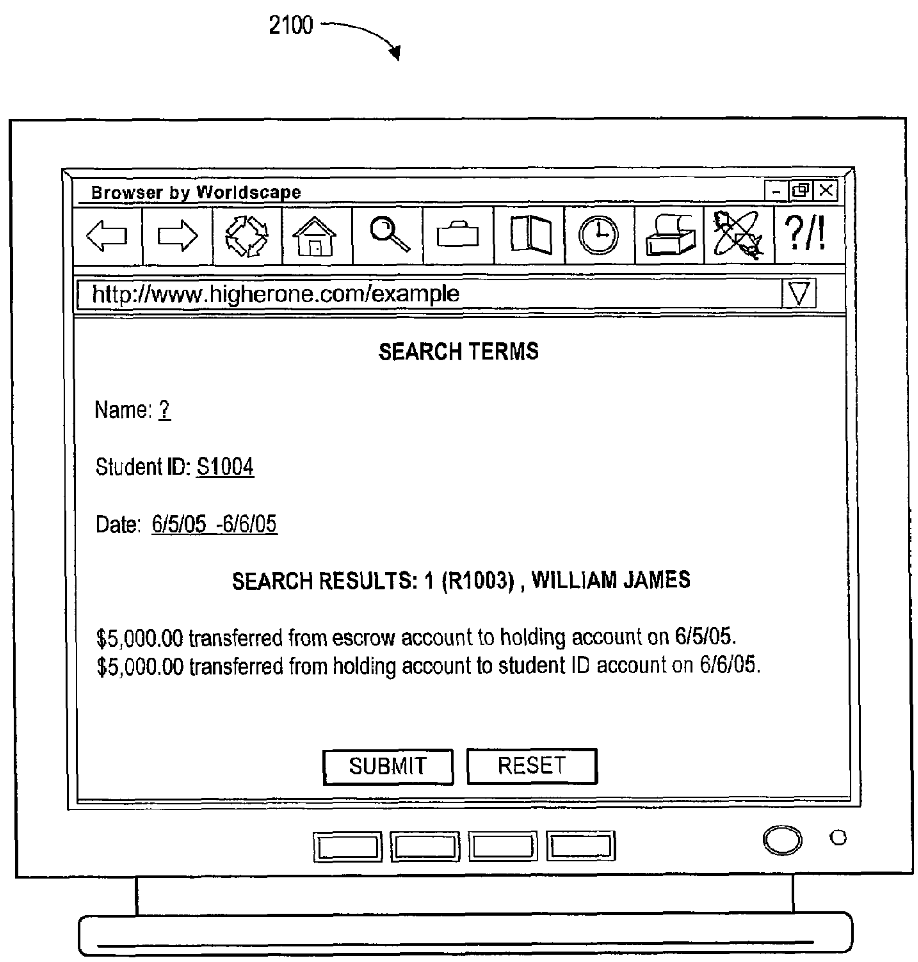
FIG. 21 illustrates a search display according to some embodiments.

FIG. 21 illustrates a search display 2100 according to some embodiments. The search display 2100 might, for example, be used by a student to check on the status of his or her refund. The display 2100 could also be used by a university employee or someone else who is authorized to perform a search. In general, one or more search terms may be provided and one or more search results may be displayed (e.g., a date and amount associated with a refund).

Refund Reports

Figure 22:
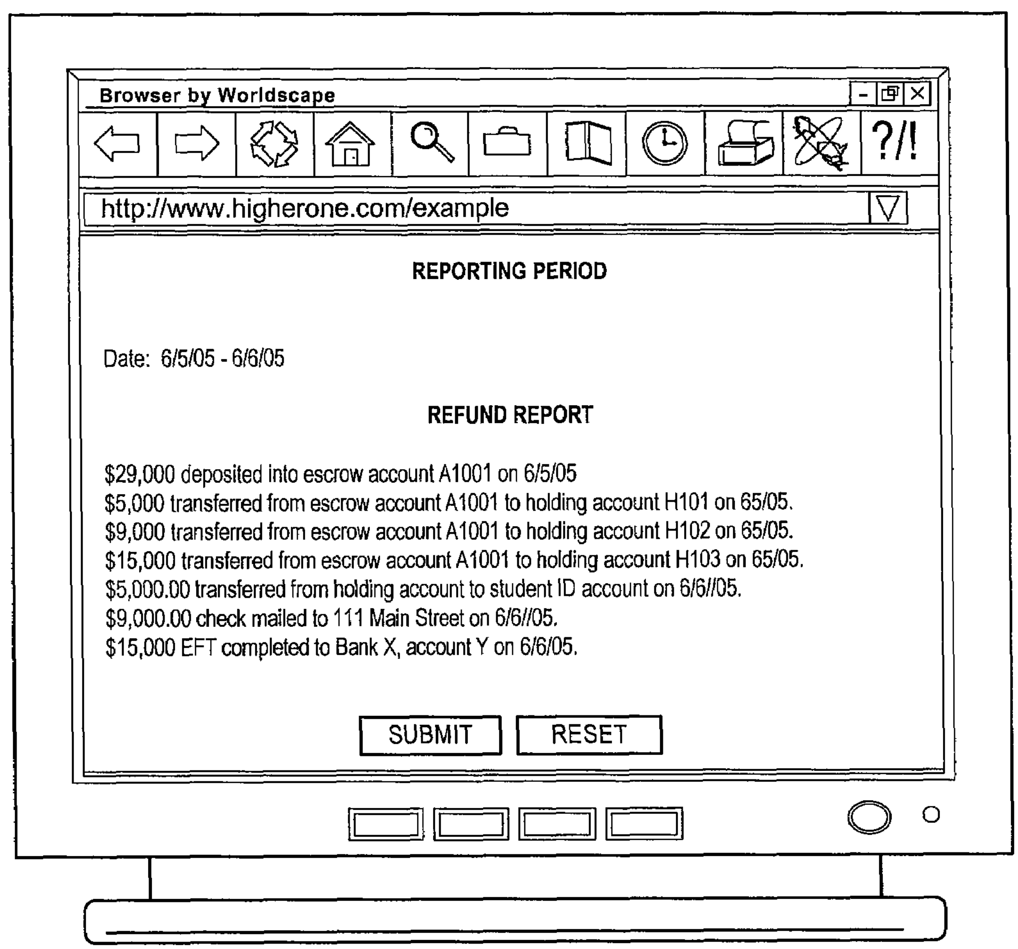
FIG. 22 illustrates a report display according to some embodiments.

FIG. 22 illustrates a report display 2200 according to some embodiments. The report display 2200 might, for example, be used by a university employee to generate a document in compliance with an audit trail requirement. In general, one or more report parameters may be provided (e.g., a range of dates) and report results are displayed (e.g., listing all transactions that were processed during a given week). According to some embodiments, refund reports may provide details of the relationship and the interests of the parties (e.g., the student and other parties) to indicate the existence of a fiduciary relationship and may be generated in the regular course of business.

ADDITIONAL EMBODIMENTS

The following illustrates various additional embodiments of the present invention. These do not constitute a definition of all possible embodiments, and those skilled in the art will understand that the present invention is applicable to many other embodiments. Further, although the following embodiments are briefly described for clarity, those skilled in the art will understand how to make any changes, if necessary, to the above-described apparatus and methods to accommodate these and other embodiments and applications.

In some embodiments, a student simply selects a refund delivery preference from a set of pre-determined options. According to other embodiments, one or more of the options may are associated with an existing delivery rule and/or a delivery rule defined by a student. By way of example only, a delivery rule might indicate that a refund check will be mailed to (i) a home address when school is not in session and (ii) a local address when school is in session. As another example, a student may define a threshold amount that determines how a refund will be delivered (e.g., refunds less than $1,000 will be deposited into his or her student ID account while larger refunds are deposited into a regular checking account).

According to some embodiments described herein, an escrow account is used when transferring funds. According to other embodiments, no escrow account is required. For example, a university might transfer each refund amount directly into a temporary holding account at a facilitating bank (e.g., previously or now established based on information received from the university or a refund controller).

Figure 23:
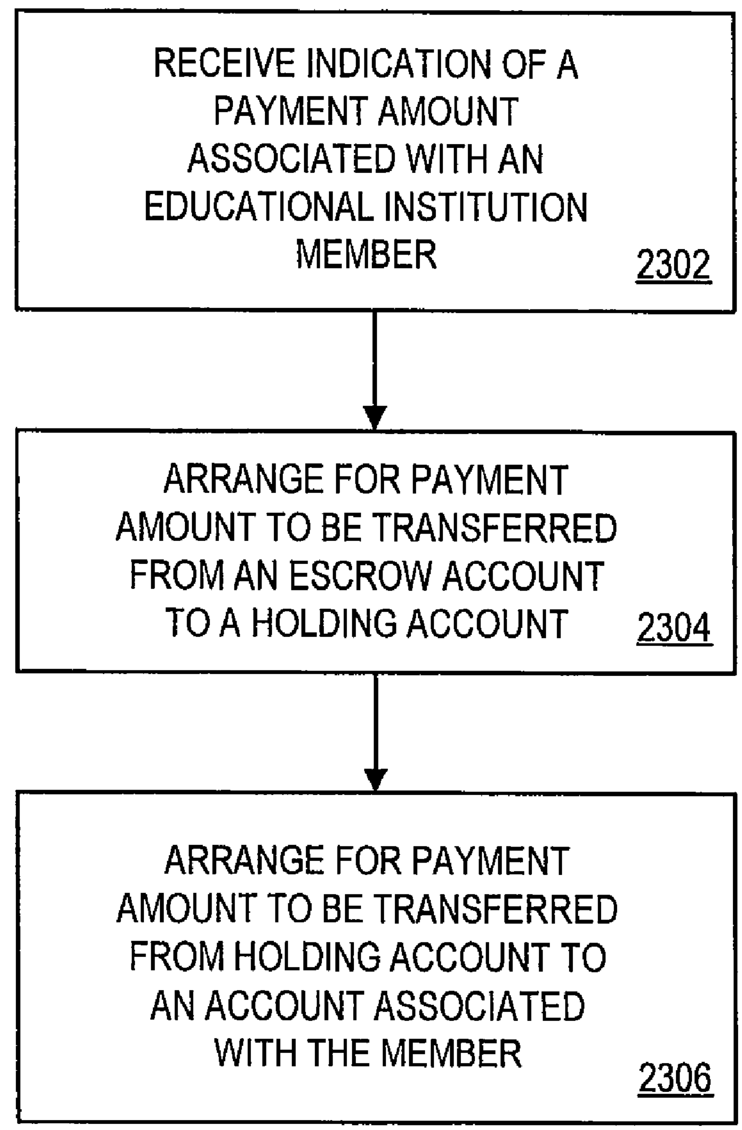
FIG. 23 is a flow chart of a method according to still another embodiment.

Note that the various embodiments described herein may be used separately, in combination, or in other situations. For example, FIG. 23 is a flow chart of a method according to still another embodiment. At 2302, an indication of a payment amount associated with an educational institution member is received. For example, the payment amount might be to reimburse a professor for teaching-related travel expenses. At 2304, it is arranged for the payment amount to be transferred from an escrow account that is associated with a plurality of members to a holding account that is associated with the member who will receive the payment amount. At 2306, it is arranged for the payment amount to be transferred from the holding account to an account associated with the member. According to this embodiment, a member might be, for example, a student, an employee, or an alum of an educational institution.

Figure 24:
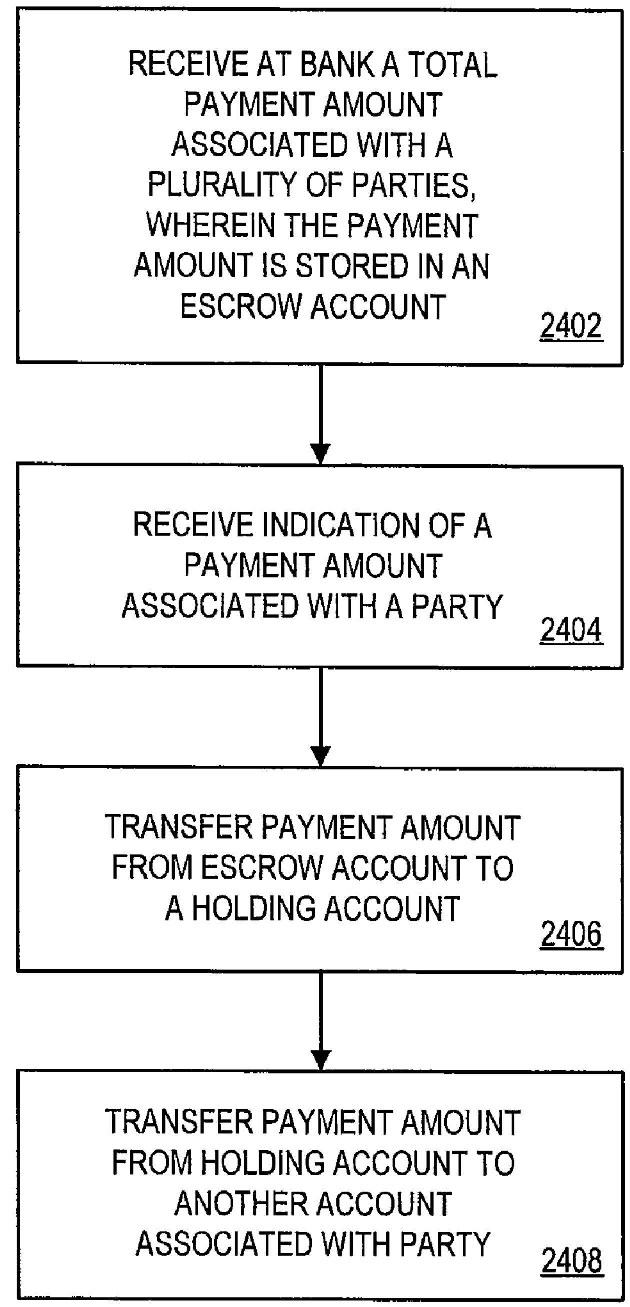
FIG. 24 is a flow chart of a method according to yet another embodiment.

FIG. 24 is a flow chart of a method according to yet another embodiment. In this case, a total payment amount associated with a plurality of parties is received at a bank and is stored in an escrow account at 2402. Note that the total payment amount may be received from an institution other than an educational institution (e.g., a corporation, a government entity, or a charitable organization). At 2404, an indication of a payment amount associated with a party is received at the bank. The payment amount is then transferred from the escrow account to a holding account at 2406 and then transferred from the holding account to another account associated with the party at 2408.

Figure 25:
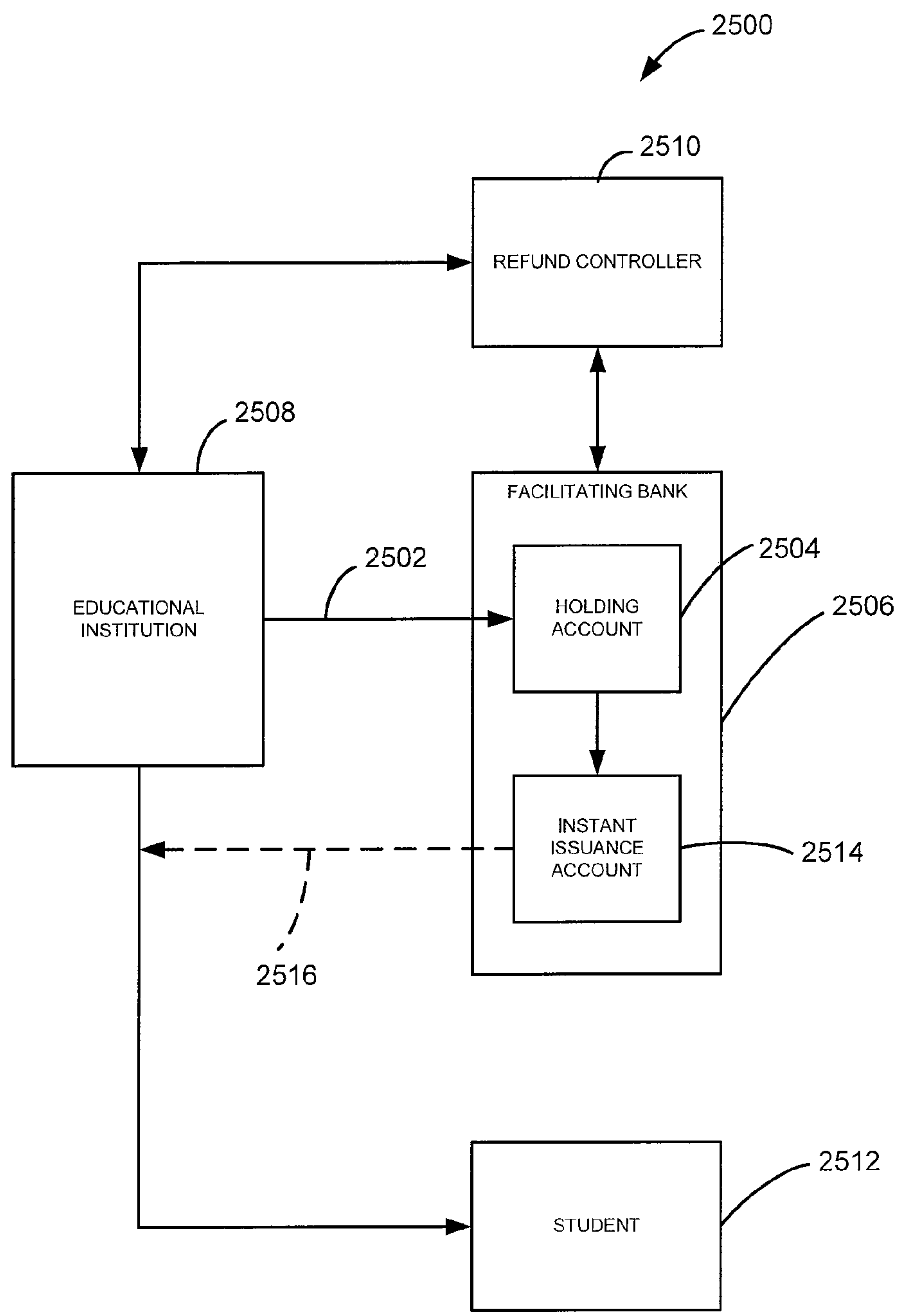
FIG. 25 illustrates a transaction according to some embodiments.

Referring now to FIG. 25, a transaction 2500 according to some embodiments is illustrated. After first transferring a total refund amount 2502 to a holding/pending instructions account 2504 in a facilitating bank 2506, an educational institution 2508 requests authorization of a refund controller 2510 to issue an instant paper check (not shown) to a student 2512. The check can be in an amount equal to or less than total refund amount 2502. Upon receipt of the authorization request, refund controller 2510 verifies that the amount of the funds is equal to or less than the amount of funds available to student 2512. If it is equal to or less, refund controller 2510 authorizes educational institution 2508 to issue an instant paper check to student 2512 for the payment amount requested. In some, but not all embodiments, simultaneously or prior to providing authorization, refund controller 2510 transfers funds equal to the payment amount requested from holding account 2504 to an instant issuance account 2514 at facilitating bank 2506 or another bank. As indicated by hashed line 2516, in some, but not all embodiments, the instant paper check is drawn on instant issuance account 2514. In some embodiments, the funds are transferred from the original account in which they were deposited and refund controller 2510 accounts for the transfer based on information related to student 2512.

Figure 26:
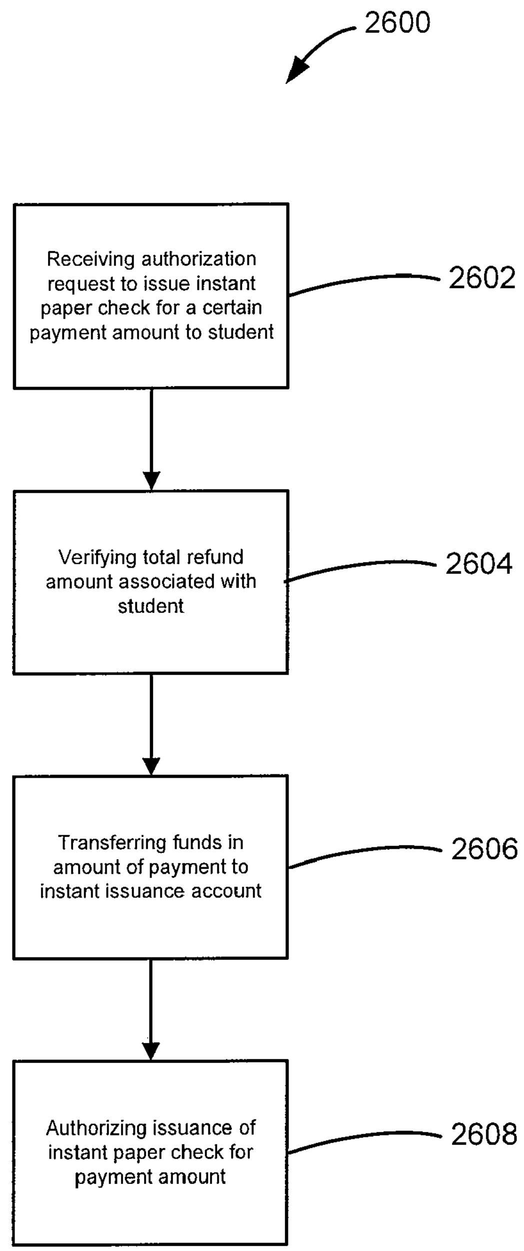
FIG. 26 is a flow chart of a method according to some embodiments.

Referring now to FIG. 26, some embodiments of the disclosed subject matter include a method or system 2600 of facilitating a transfer of a refund amount from an educational institution to a student. The educational institution is typically associated with at least one of: (i) a university; (ii) a college; (iii) a technical school; (iv) a professional education program; (v) a government training program; and (vi) an on-line educational program. At 2602, an educational institution transmits a request for authorization to issue an instant paper check to the student to a refund controller. The request includes information such as a payment amount equal to at least a portion of a total refund amount associated with the student. At 2604, the refund controller verifies that the payment amount is equal to or less than an amount of funds available to the student. If the payment amount is equal to or less than an amount of funds available to the student, at 2606, the refund controller transfers funds equal to the payment amount to an instant issuance account. In some embodiments, verifying includes at least one of: (i) comparing refund amounts associated with a plurality of students to an amount currently available in an escrow account; (ii) comparing the total refund amount to a pre-determined threshold limit; (iii) comparing a student identifier with a list of existing student identifiers; (iv) calculating a hash value associated with the received indication; (v) calculating a checksum associated with the received indication; and (vi) generating and providing the educational institution with at least one of a sequence identifier, a secret code, and an encrypted code. Part (vi) of the verifying step is similar to the transaction approval code generated and provided by credit card companies. At 2608, the refund controller authorizes the educational institution to issue an instant paper check for the payment amount to the student. The instant paper check draws from the instant issuance account.

In some embodiments, the amount of funds available to the student is updated to reflect the request for authorization of an instant paper check and the payment amount and or the balance of a soft account in the name of the student can be updated to reflect payment of the payment amount. In the case where the payment amount is equal to the total refund amount, the soft account in the name of the student can be closed after issuance of the instant paper check.

In some cases, the payment amount is less than the amount of funds available to the student thereby creating a balance owed to the student after the instant paper check is issued. For those cases, in some embodiments, an additional method of refund delivery associated with the student can be determined and the balance of refund amounts can automatically be provided to the student in accordance with the determined method of delivery. As mentioned above, examples of additional methods of refund delivery include (i) an electronic transfer of the refund amount to a bank account associated with the student, (ii) a paper check mailed to an address associated with the student, and (iii) a transfer of the refund amount to a credit account associated with the student.

In many embodiments described herein, bank accounts are distributed through a relationship with an educational institution, such as a university. According to another embodiment, however, bank accounts can instead be distributed through a relationship with any other type of institution that has a defined constituency and/or issues identification cards, such as a corporation, a government entity, or a charitable organization.

The present invention has been described in terms of several embodiments solely for the purpose of illustration. Persons skilled in the art will recognize from this description that the invention is not limited to the embodiments described, but may be practiced with modifications and alterations.

What is claimed:

1. A computer-readable medium having computer-executable instructions executed on a computer processor to control a transfer of a refund amount from an educational institution to a student, said instructions comprising:

receiving at a refund controller that is independent from an educational institution a request from the educational institution for authorization of an instant paper check drawn on a a soft bank account that is independent from the refund controller of a payment amount equal to at least a portion of a total refund amount associated with the student of the educational institution;

verifying at the refund controller that the payment amount is equal to or less than an amount of funds available to the student; and sending authorization from the refund controller to the educational institution to issue an instant paper check for the payment amount to the student.

2. A computer-readable medium according to claim 1, further comprising:

transferring funds equal to the payment amount to an instant issuance account

3. A computer-readable medium according to claim 2, wherein the instant paper check draws from the instant issuance account.

4. A computer-readable medium according to claim 1, further comprising:

updating the amount of funds available to the student based on the request for authorization of an instant paper check and the payment amount.

5. A computer-readable medium according to claim 1, further comprising:

updating a balance of a soft account in the name of the student to reflect payment of the payment amount.

6. A computer-readable medium according to claim 1, further comprising:

closing a soft account in the name of the student after issuance of the instant paper check for the refund amount.

7. A computer-readable medium according to claim 1, wherein the payment amount is equal to the total refund amount.

8. A computer-readable medium according to claim 1, wherein the funds are transferred from a pending instructions account.

9. A computer-readable medium according to claim 1, further comprising:

determining additional method of refund delivery associated with the student; and automatically arranging for refund amounts not provided to the student via an instant paper check to be provided to the student in accordance with the determined method of delivery.

10. A computer-readable medium according to claim 9, wherein the method of delivery comprises one of: (i) an electronic transfer of the refund amount to a bank account associated with the student, (ii) a paper check mailed to an address associated with the student, and (iii) a transfer of the refund amount to a credit account associated with the student.

11. A computer-readable medium according to claim 1, wherein said verifying includes at least one of: (i) comparing refund amounts associated with a plurality of students to an amount currently available in an escrow account; (ii) comparing the total refund amount to a pre-determined threshold limit; (iii) comparing a student identifier with a list of existing student identifiers; (iv) calculating a hash value associated with the received indication; (v) calculating a checksum associated with the received indication; and (vi) generating and providing the educational institution with at least one of a sequence identifier, a secret code, and an encrypted code.

12. A computer-readable medium according to claim 1, wherein the educational institution is associated with at least one of: (i) a university; (ii) a college; (iii) a technical school; (iv) a professional education program; (v) a government training program; and (vi) an on-line educational program.

13. A system for facilitating a transfer of a refund amount from an educational institution to a student, said system comprising:

means for receiving at a refund controller that is independent from an educational institution a request from the educational institution for authorization of an instant paper check drawn on a soft bank account that is independent from the refund controller of a payment amount equal to a total refund amount associated with the student of the educational institution;

means for verifying at the refund controller that a status of the total refund amount associated with the student;

means for transfernng funds equal to the total refund amount from the soft bank account to an instant issuance account; and means for sending authorization from the refund controller to the educational institution to issue an instant paper check for the total refund amount to the student, wherein the instant paper check draws from the instant issuance account.

14. A system according to claim 13, further comprising:

means for updating the status of the total refund amount associated with the student based on the request for authorization of an instant paper check and the payment amount.

15. A system according to claim 13, further comprising:

means for closing a soft account in the name of the student after issuance of the instant paper check for the total refund amount.

* * * * *